(12) United States Patent
Hammond

(10) Patent No.: US 11,421,969 B2
(45) Date of Patent: Aug. 23, 2022

(54) CARTRIDGE FOR MILITARY TRAINING DEVICE, ACTIVATION DEVICE FOR CARTRIDGE, CARTRIDGE KIT, AND RELATED METHODS

(71) Applicant: MIL-SIM-FX International Inc., Tillsonburg (CA)

(72) Inventor: Tamara Hammond, Tillsonburg (CA)

(73) Assignee: MIL-SIM-FX INTERNATIONAL INC., Tillsonburg (CA)

( * ) Notice: Subject to any disclaimer, the term of this patent is extended or adjusted under 35 U.S.C. 154(b) by 393 days.

(21) Appl. No.: 16/349,428

(22) PCT Filed: Nov. 14, 2017

(86) PCT No.: PCT/CA2017/051358
§ 371 (c)(1),
(2) Date: May 13, 2019

(87) PCT Pub. No.: WO2018/085948
PCT Pub. Date: May 17, 2018

(65) Prior Publication Data
US 2019/0301843 A1    Oct. 3, 2019

Related U.S. Application Data

(60) Provisional application No. 62/420,862, filed on Nov. 11, 2016.

(51) Int. Cl.
*F42B 8/02* (2006.01)
*F41A 33/04* (2006.01)
(Continued)

(52) U.S. Cl.
CPC ............... *F42B 8/02* (2013.01); *F41A 33/04* (2013.01); *F42B 8/00* (2013.01); *G09B 9/003* (2013.01);
(Continued)

(58) Field of Classification Search
CPC . G09B 9/003; G09B 9/006; F42B 8/18; F42B 8/20; F42B 8/22; F42B 8/24;
(Continued)

(56) References Cited

U.S. PATENT DOCUMENTS 5,411,225 A    5/1995  Lannon et al.
5,788,500 A *  8/1998  Gerber .................. F41G 3/2666
                                                          102/355
(Continued)

FOREIGN PATENT DOCUMENTS

WO    WO-2016024921 A1 *  2/2016  ............... F41G 3/26

OTHER PUBLICATIONS

International Patent Application No. PCT/CA2017/051358, International Preliminary Report on Patentability dated May 14, 2019.
(Continued)

*Primary Examiner* — John Cooper
(74) *Attorney, Agent, or Firm* — MBM Intellectual Property Law; Louis B. Allard

(57) ABSTRACT

Provided is a non-pyro cartridge for military training devices. The cartridge has a refillable compressed gas compartment fitted with a refill valve, which allows for quick reuse of the cartridge. The cartridge further has a blast compartment that receive a rush of compressed air from the gas compartment when the cartridge is triggered/detonated. Also provided is an activation device for the cartridge. The cartridge and activation device can generate physical and digital effects on the battlefield that safely and realistically simulate anti-tank weapon signatures, mortar weapon signatures, landmines signatures, improvised explosive device weapon signatures, artillery point of impact signatures, hand grenade signatures, weapon impact signatures on vehicles, (Continued)

weapon impact signatures on buildings, multiple types of battlefield effects, weapon signatures, impact signatures with a single device type.

19 Claims, 17 Drawing Sheets

(51) Int. Cl.
| | | |
|---|---|---|
| *F42B 8/00* | (2006.01) | |
| *G09B 9/00* | (2006.01) | |
| *F42B 8/20* | (2006.01) | |
| *F42B 8/26* | (2006.01) | |
| *F42B 8/28* | (2006.01) | |

(52) U.S. Cl.
CPC . *F42B 8/20* (2013.01); *F42B 8/26* (2013.01); *F42B 8/28* (2013.01)

(58) Field of Classification Search
CPC ...... F42B 8/26; F42B 8/00; F42B 8/02; F42B 12/42; F41A 33/00; F41A 33/02; F41A 33/04; F41H 9/06
USPC ........ 434/16, 18, 19, 11; 102/395, 276, 513, 102/502, 482, 498
See application file for complete search history.

(56) References Cited

U.S. PATENT DOCUMENTS

| | | | |
|---|---|---|---|
| 6,065,404 A | 5/2000 | Ripingill, Jr. et al. | |
| 6,604,946 B2* | 8/2003 | Oakes | F42B 12/365 |
| | | | 102/444 |
| 9,557,038 B2* | 1/2017 | Blair | F21V 15/04 |
| 2004/0096806 A1* | 5/2004 | Davidsson | F41G 3/26 |
| | | | 434/11 |
| 2006/0230972 A1* | 10/2006 | Ouliarin | F42B 12/42 |
| | | | 102/487 |
| 2007/0026364 A1* | 2/2007 | Jones | F41A 33/02 |
| | | | 434/11 |
| 2007/0249262 A1 | 10/2007 | Siu et al. | |
| 2008/0216699 A1* | 9/2008 | McAleer | F42B 8/26 |
| | | | 102/367 |
| 2008/0257193 A1 | 10/2008 | Siu et al. | |
| 2008/0311822 A1 | 12/2008 | Kim | |
| 2010/0058947 A1* | 3/2010 | Davis | F42B 8/26 |
| | | | 102/498 |
| 2010/0072895 A1* | 3/2010 | Glynn | H05B 41/34 |
| | | | 315/76 |
| 2010/0199960 A1 | 8/2010 | Chong | |
| 2014/0130695 A1 | 5/2014 | Chong | |
| 2015/0083010 A1 | 3/2015 | Macdonald et al. | |
| 2015/0128823 A1* | 5/2015 | Akcasu | F42B 10/56 |
| | | | 102/501 |

OTHER PUBLICATIONS

International Patent Application No. PCT/CA2017/051358, International Search Report and Written Opinion dated Feb. 22, 2018.

* cited by examiner

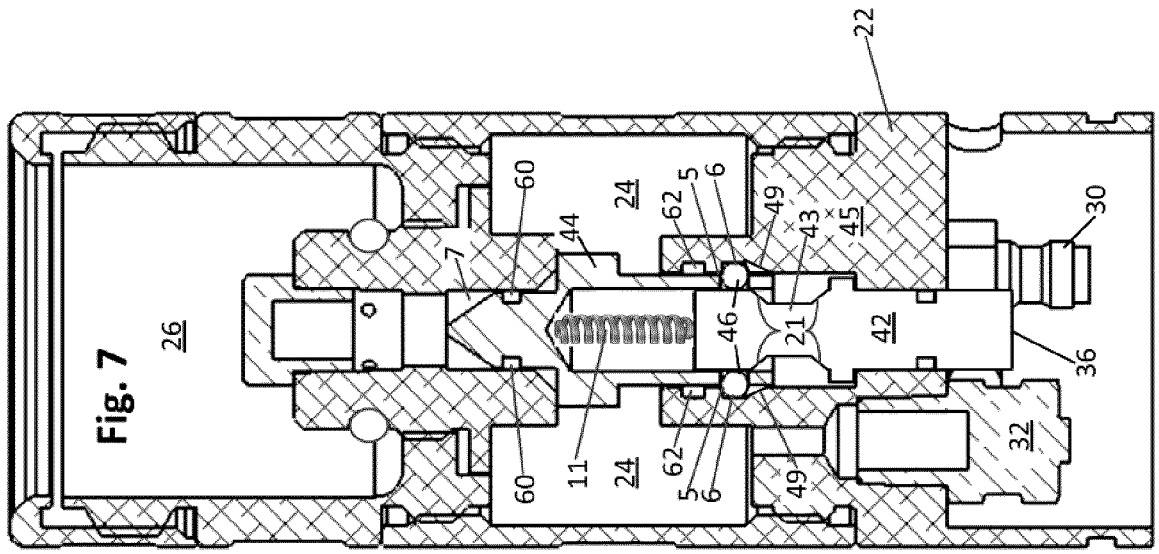
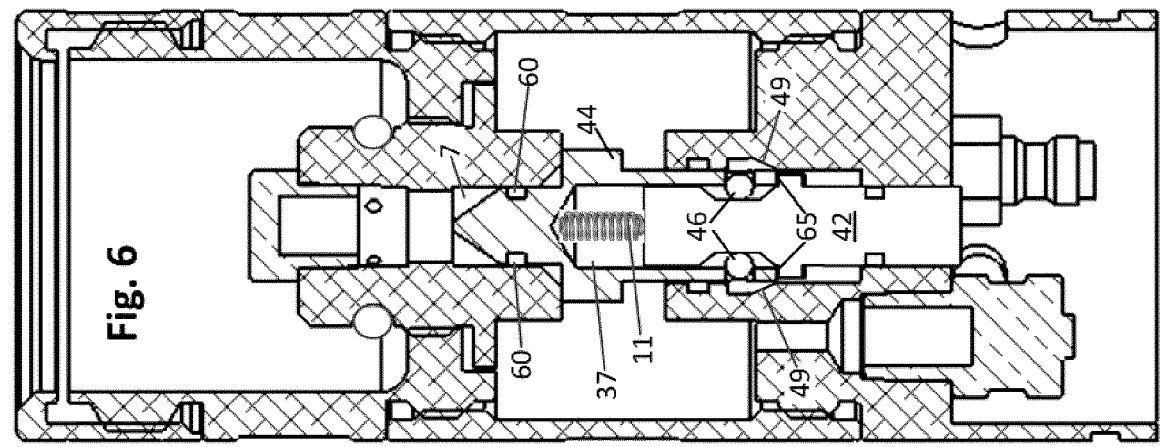

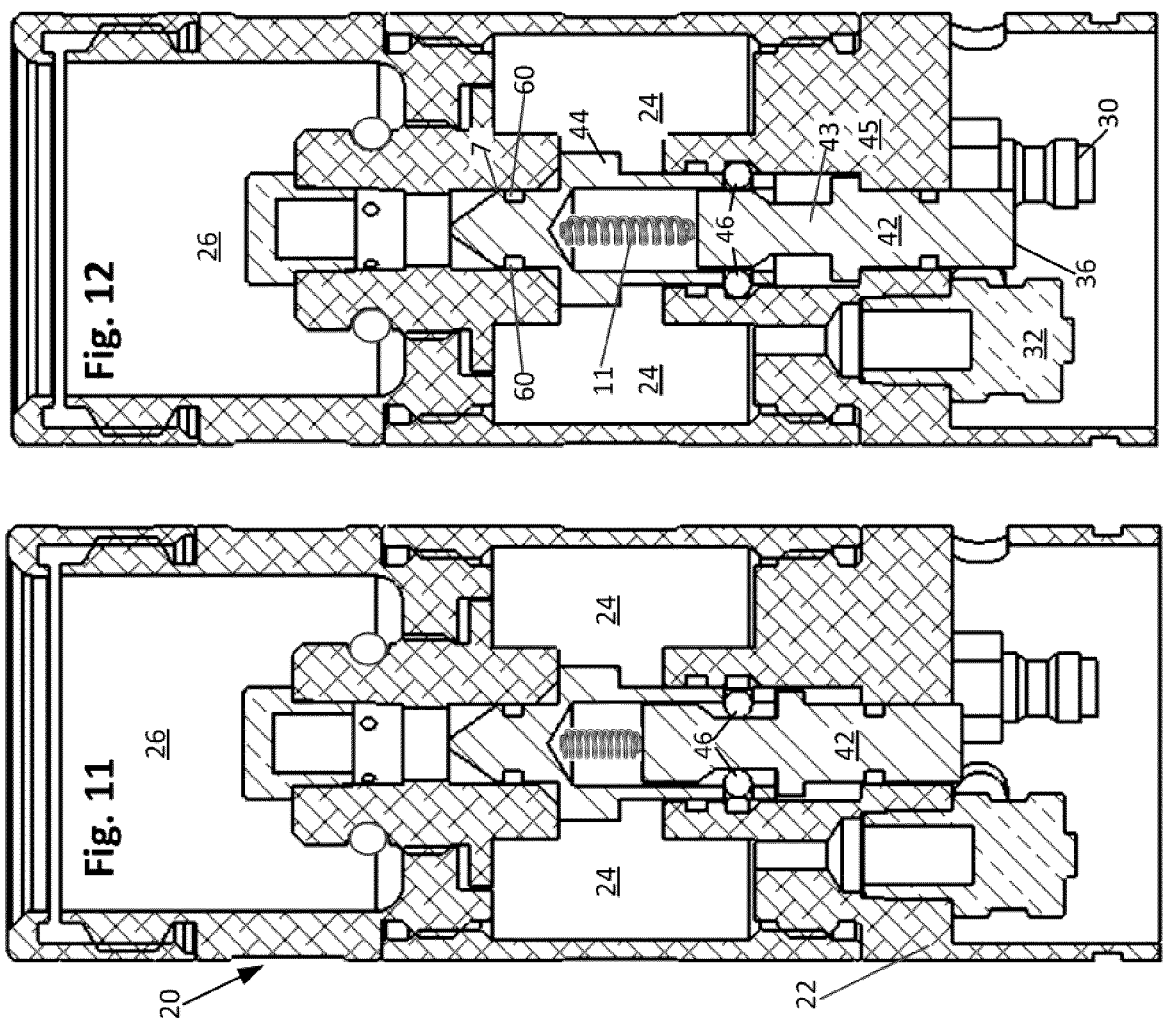

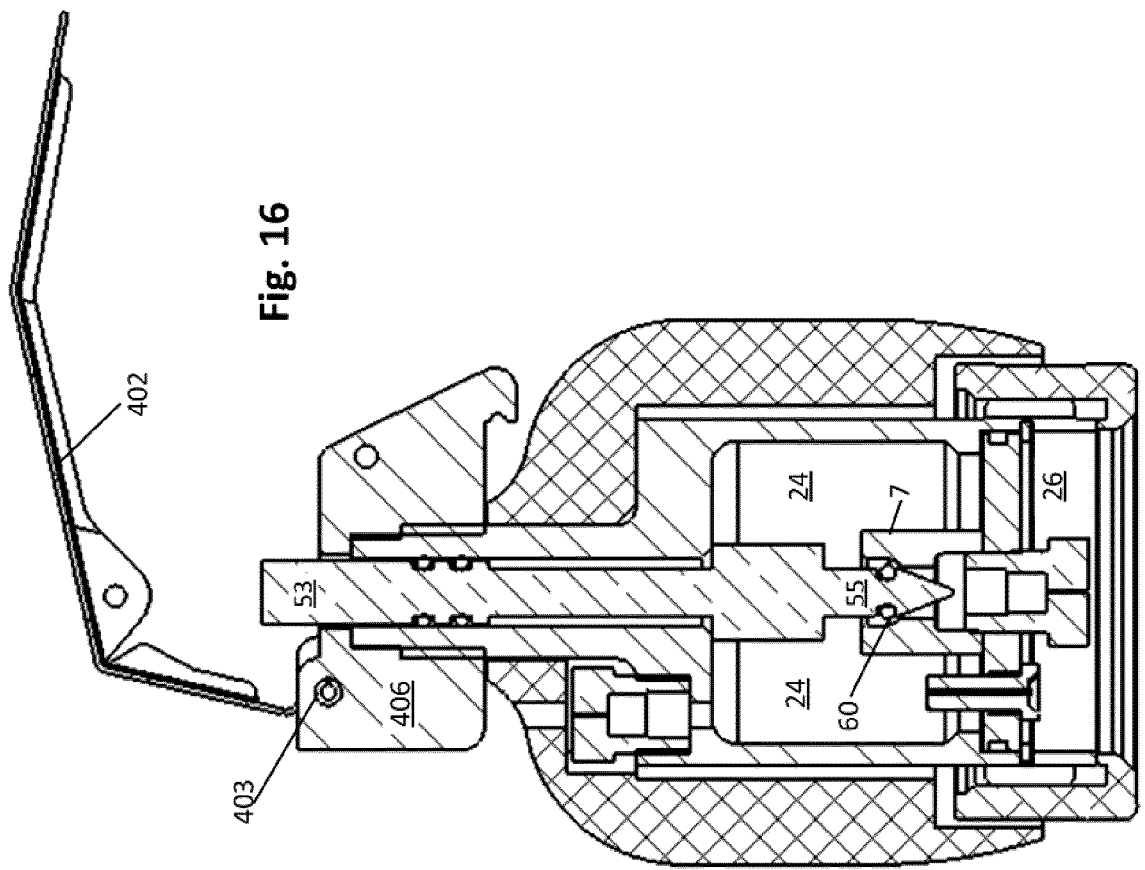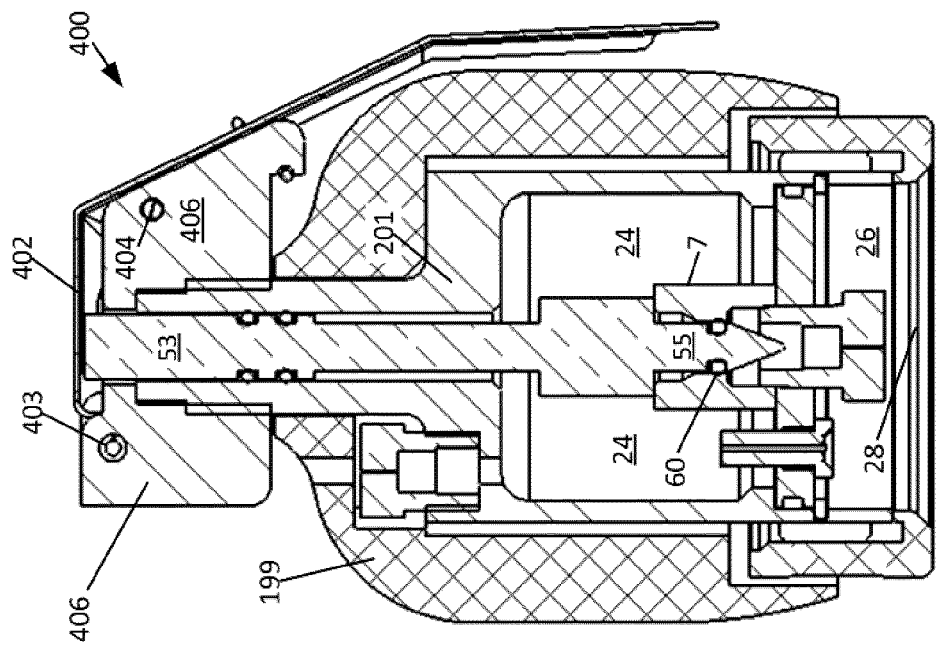

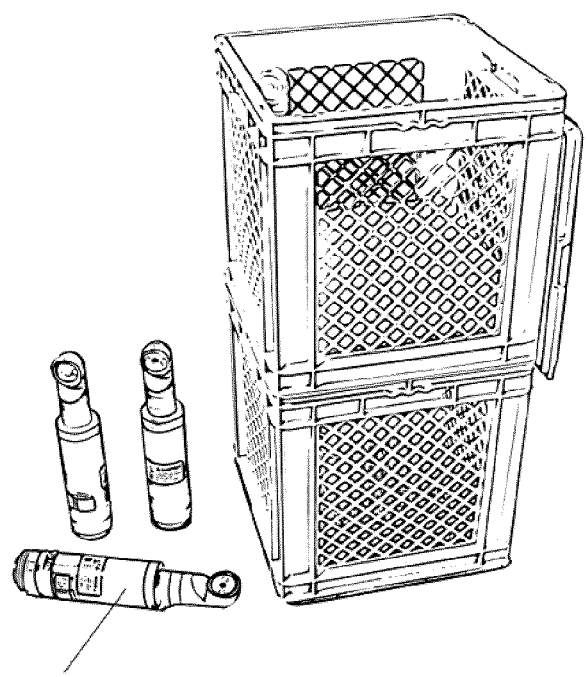
Large Cartridge
Fig. 29
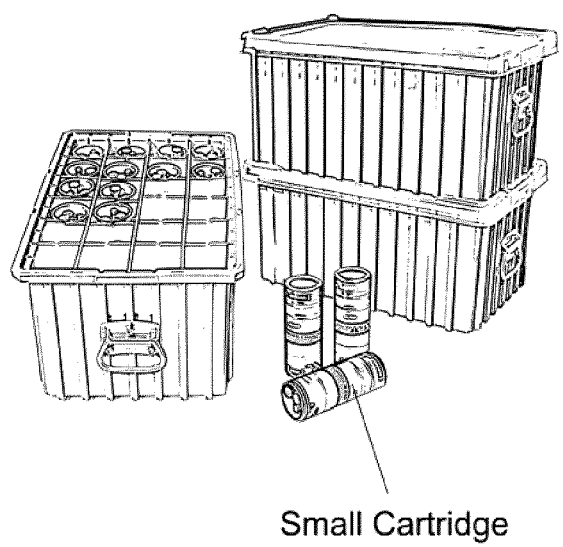
Small Cartridge

CARTRIDGE FOR MILITARY TRAINING DEVICE, ACTIVATION DEVICE FOR CARTRIDGE, CARTRIDGE KIT, AND RELATED METHODS

FIELD

The present disclosure relates to military training devices. In particular, the present disclosure relates to non-pyro training devices and related methods.

BACKGROUND

Military training devices that generate a loud blast and release smoke are known. Some of these devices are relatively small and light and, can be easily deployed in the field. Some devices are pyro device that are inherently dangerous and that cannot be easily coupled to visual indicators of deflagrations. Many of them ore are single use and, therefore, not economical. The reusable ones take a long time to reload, which slows down military exercises or requires a large inventory of devices. Improvements are desirable.

SUMMARY OF INVENTION

According to a first aspect, there is provided a non-pyro military training cartridge comprising: a refillable compressed gas compartment (RCGC); a refill valve connected to the RCGC; a blast compartment; and a valve mechanism operationally connecting the RCGC to the blast compartment, the valve mechanism having an open configuration where the RCGC is in fluid communication with the blast compartment, the valve mechanism further having a sealed configuration where the RCGC is hermetically sealed from the blast compartment, the blast compartment producing a blast when compressed gas from the RCGC propagates through the valve mechanism and into the blast compartment when the valve mechanism configuration changes from the sealed configuration to the open configuration, the refill valve being configured for connection to a compressed gas source to refill the RCGC with compressed gas.

In an embodiment, the cartridge further comprises a conduit extending from the RCGC to the blast compartment, wherein: the valve mechanism comprises: a stopper positioned to block the conduit when the valve mechanism is in the sealed configuration; and a release mechanism configured to reposition the stopper to unblock the conduit when the valve mechanism configuration changes from the sealed configuration to the open configuration.

In an embodiment, the release mechanism is a push-to-release mechanism.

In an embodiment, the stopper comprises a stopper body, the stopper body having a seal end and an opposite end, the seal end engages the conduit to block the conduit when the valve mechanism is in the sealed configuration, the stopper body defines a cylinder cavity that has an opening defined at the opposite end of the stopper body, the valve mechanism further comprises a piston movably engaged in the cylinder cavity, and the push-to-release mechanism is configured to remove the seal end from the conduit when the piston is pushed toward an inside of the cylinder cavity.

In an embodiment, the RCGC has a base portion that defines a passageway, the stopper body is slidingly engaged in the passageway, the stopper body and the passageway have cooperating elements that releasably lock the stopper body in the passageway when the valve mechanism is in the sealed configuration.

In an embodiment, the piston has a end portion and a neck portion, the end portion having a diameter that is larger than a diameter of the neck portion, the cooperating elements include: an aperture defined by the stopper body, a recess defined by the base portion and located in the passageway, and a bearing element, when in the sealed configuration, the bearing element is positioned against the end portion the piston shaft, the bearing element is also partially positioned in the aperture of the stopper body and partially positioned in the recess of the passageway, thereby locking the stopper body in the passageway, the stopper body becoming unlocked from the base portion of the RCGC when the piston is subjected to a push toward the inside of the cylinder cavity to align the neck portion of the piston shaft with the bearing element, thereby causing the bearing element to move out of recess of the passageway and toward the neck portion to allow movement of the stopper body in the passageway.

In an embodiment, the cartridge further comprises a biasing element located in the cylinder cavity, the biasing element configured to push against the piston and to move the piston with respect to the stopper body and toward an outside of the cylinder cavity when the piston is released after having been pushed toward the inside of the cylinder cavity.

In an embodiment, the piston defines a ramp extending from the end portion of the piston shaft to the neck portion of the piston shaft, when the valve mechanism is in the open configuration: the bearing element is positioned against the neck portion of the piston shaft and partially in the aperture defined by the stopper body, and the piston is configured to be pushed toward the inside of the cylinder cavity and is further configured to push against the stopper body to position the seal end of the stopper body in the conduit, when the seal end of the stopper body is positioned in the conduit and prior to a release of the piston, the bearing element and the aperture of the stopper body are aligned with the recess of the passageway, when the shaft is released: the biasing element pushes the piston toward the outside of the cylinder cavity, and the ramp of the piston shaft pushes on the bearing element as the piston moves toward the outside of the cylinder cavity, the ramp of the piston shaft pushing on the bearing element causes: the bearing element to move away from the neck of the piston shaft and to partially enter the recess of the passageway, and the end portion of the piston shaft to become aligned with the bearing element.

In an embodiment, the biasing element is a spring element.

In an embodiment, when the valve mechanism is in the sealed configuration and when the RCGC is filled with compressed gas, the stopper body is exposed to a gas pressure in the RCGC, when the release mechanism is activated, the stopper body is configured to be positioned to unblock the conduit by a force exerted by the gas pressure on the stopper body.

In an embodiment, the cartridge further comprises a seal element located at the seal end.

In an embodiment, the seal element is an O-ring.

In an embodiment, the blast compartment is configured to receive powder.

In an embodiment, the blast compartment comprises a displaceable seal configured to allow compressed gas from the RCGC to enter the blast compartment when the valve mechanism configuration changes from the sealed configuration to the open configuration, the displaceable seal further configured to prevent matter present in the blast compartment to enter the RCGC in absence of compressed gas entering the blast compartment.

In an embodiment, the blast compartment is configured to receive a burst disc.

In an embodiment, the cartridge further comprises at least one of a pressure relief valve and a pressure status indicator, the pressure relief valve configure to release pressure from the RCGC to the atmosphere upon a pressure in the RCGC exceeding a threshold amount, the pressure status indicator being connected to the RCGC and configured to indicate to a user when RCGC is filled with compressed gas.

In an embodiment, the stopper comprises a stopper body, the stopper body having a seal end, the seal end engages the conduit to block the conduit when the valve mechanism is in the sealed configuration, the release mechanism includes a lock element configured to prevent movement of the stopper body and the seal end with respect to the conduit when the lock element is in a lock position, the release mechanism is configured to cause a pressure in the RCGC to push the stopper body to remove the seal end from the conduit when the lock element is displaced from the lock position to an unlock position.

In an embodiment, the stopper further comprises a lock end opposite the seal end, the lock element is configured to interfere with the lock end when the lock element is in the lock position.

In an embodiment, the cartridge further comprises a housing wherein: lock element is a lock pin, the lock pin having a portion connected to the housing when the pin is in the lock position.

In an embodiment, the cartridge further comprises a seal element located at the seal end.

In an embodiment, the blast compartment is configured to receive at feast one of: powder, fake blood, tracer rounds, moulage parts, projectiles and scent compounds, and wherein filing the blast compartment with fresh material includes filing the blast material with at least one of the powder, fake blood, tracer rounds, moulage parts, projectiles and scent compounds.

In an embodiment, the blast compartment is configured to receive a burst disc.

In an embodiment, the cartridge further comprises at least one of a pressure relief valve and a pressure status indicator, the pressure relief valve configured to release pressure from the RCGC to the atmosphere upon a pressure in the RCGC exceeding a threshold amount, the pressure status indicator being connected to the RCGC and configured to indicate to a user when RCGC is filled with compressed gas.

According to a further aspect, there is provided a kit comprising a cartridge according to the present disclosure and a burst disc configured to close the blast compartment.

In an embodiment, the kit further comprises at least one of: powder, fake blood, tracer rounds, moulage parts, projectiles and scent compounds, and wherein filing the blast compartment with fresh material includes filing the blast material with at least one of the powder, fake blood, tracer rounds, moulage parts, projectiles and scent compounds, the blast compartment being configured to receive the at least one of: powder, fake blood, tracer rounds, moulage parts, projectiles and scent compounds, and wherein filing the blast compartment with fresh material includes filing the blast material with at least one of the powder, fake blood, tracer rounds, moulage parts, projectiles and scent compounds.

In an embodiment, the kit further comprises a casing designed to look like a military weapon, the casing being configured to receive and hold the cartridge, the casing and the cartridge defining a training weapon when the cartridge is received and held in the casing.

In an embodiment, the casing is a training grenade casing.

In an embodiment, the casing is a training landmine casing.

In an embodiment, the casing is a training mortar casing.

In an embodiment, the casing is a training rocket propelled grenade casing.

According to yet a further aspect, there is provided an activation device comprising a holder portion to removably hold a cartridge, the cartridge having a refillable compressed gas compartment (RCGC); a refill valve connected to the RCGC; a blast compartment; and a valve mechanism operationally connecting the RCGC to the blast compartment, the valve mechanism having an open configuration where the RCGC is in fluid communication with the blast compartment, the valve mechanism further having a sealed configuration where the RCGC is hermetically sealed from the blast compartment, the blast compartment producing a blast when compressed gas from the RCGC propagates through the valve mechanism and into the blast compartment when the valve mechanism configuration changes from the sealed configuration to the open configuration, the refill valve being configured for connection to a compressed gas source to refill the RCGC with compressed gas; and a trigger module connected to the holder portion, the trigger module configured to trigger the cartridge upon receiving a trigger signal.

In an embodiment, the activation device further comprises an interface module operationally connected to the trigger module, the interface module configured to receive an action signal from a signal source and to output the trigger signal in accordance with the action signal.

In an embodiment, the activation device further comprises a light source, wherein the action signal includes data indicating that the light source is to be energized when the cartridge is triggered, the interface module to send a light-on signal to the light source in response to receiving the action signal.

In an embodiment, the activation device further comprises a radio frequency (RF) source, wherein the action signal includes data indicating that the RF source is to be energized when the cartridge is triggered, the interface module to send an RF-on signal to the RF source in response to receiving the action signal.

In an embodiment, the activation device further comprises at least one of: a light source, and a radio frequency (RF) source, wherein: the action signal includes data indicating at least one of: the light source is to be energized when the cartridge is triggered, and the RF source is to be energized when the cartridge is triggered, the interface module to send, in accordance with the data included in the action signal, at least one of: a light-on signal to the light source when the cartridge is triggered, and an RF-on signal to the RF source when the cartridge is triggered.

In an embodiment, the activation device further comprises at least one of: a light source, and a radio frequency (RF) source, wherein the interface module is configured to receive a settings signal distinct from the action signal, the settings signal containing settings data that configure the activation device to send, in accordance with the settings data, at least one of: a light-on signal to the light source when the cartridge is triggered, and an RF-on signal to the RF source when the cartridge is triggered.

In an embodiment, the light source includes at least one of a light emitting diode (LEDs) and a laser.

In an embodiment, the LED, the laser, or both are mounted on a ring that surrounds the cartridge when the cartridge is held in the holder portion.

In an embodiment, the light-on signal is to signal to the light source to transmit device event data in real-time when the cartridge is triggered. The device event data can be operational kill codes, admin, position, ownership, identity data, etc.

In an embodiment, the RF-on signal is to signal to the RF source to transmit RF device event data in real-time when the cartridge is triggered. The device event data can be operational kill codes, admin, position, ownership, identity data, etc.

In an embodiment, the data included in the action signal further indicates that the at least one of the light source and the RF source is to send a remote trigger signal to a remote activation device to trigger a remote cartridge held by the remote activation device.

According to yet a further aspect, there is provided an activation device for a non-pyro military training cartridge, the activation device comprising a holder portion to removably hold the cartridge; and a trigger module connected to the holder portion, the trigger module configured to trigger the cartridge upon receiving a trigger signal.

In an embodiment, the activation device for a non-pyro military training cartridge further comprises an interface module operationally connected to the trigger module, the interface module configured to receive an action signal from a signal source and to output the trigger signal in accordance with the action signal.

In an embodiment, the activation device for a non-pyro military training cartridge further comprises a light source, wherein the action signal includes data indicating that the light source is to be energized when the cartridge is triggered, the interface module to send a light-on signal to the light source in response to receiving the action signal.

In an embodiment, the activation device for a non-pyro military training cartridge further comprises a radio frequency (RF) source, wherein the action signal includes data indicating that the RF source is to be energized when the cartridge is triggered, the interface module to send an RF-on signal to the RF source in response to receiving the action signal.

In an embodiment, the activation device for a non-pyro military training cartridge further comprises at least one of: a light source, and a radio frequency (RF) source, wherein: the action signal includes data indicating at least one of: the light source is to be energized when the cartridge is triggered, and the RF source is to be energized when the cartridge is triggered, the interface module to send, in accordance with the data included in the action signal, at least one of: a light-on signal to the light source when the cartridge is triggered, and an RF-on signal to the RF source when the cartridge is triggered.

In an embodiment, the activation device for a non-pyro military training cartridge further comprises at least one of: a light source, and a radio frequency (RF) source, wherein the interface module is configured to receive a settings signal distinct from the action signal, the settings signal containing settings data that configure the activation device to send, in accordance with the settings data, at least one of: a light-on signal to the light source when the cartridge is triggered, and an RF-on signal to the RF source when the cartridge is triggered.

In an embodiment, the light source includes at least one of a light emitting diode (LED) and a laser.

In an embodiment, the LED, the laser, or both are mounted on a ring that surrounds the cartridge when the cartridge is held in the holder portion.

In an embodiment, the light-on signal is to signal to the light source to generate a transmit device event data in real-time when the cartridge is triggered. The device event data can be operational kill codes, admin, position, ownership, identity data, etc.

In an embodiment, the RF-on signal is to signal to the RF source to transmit an RF device event data in real-time when the cartridge is triggered. The device event data can be operational kill codes, admin, position, ownership, identity data, etc.

In an embodiment, the data included in the action signal further indicates that the at least one of the light source and the RF source is to send a remote trigger signal to a remote activation device to trigger a remote cartridge held by the remote activation device.

In yet a further aspect, there is provided a method for triggering a cartridge according to an embodiment of the present disclosure, the method comprising the steps of: providing an activation device, the activation device comprising holder portion to removably hold the cartridge; and a trigger module connected to the holder portion, the trigger module configured to trigger the cartridge upon receiving a trigger signal; installing the cartridge in the holder portion; and providing the trigger signal the activation device.

In an embodiment, the activation device further comprises an interface module operationally connected to the trigger module, the interface module configured to receive an action signal from a signal source and to output the trigger signal in accordance with the action signal, the method further comprising sending the action signal to the interface module.

In an embodiment, the activation device further comprises a light source, the method further comprising including data in the action signal, the data indicating that the light source is to be energized when the cartridge is triggered, the interface module to send a light-on signal to the light source in response to receiving the action signal.

In an embodiment, the activation device further comprises a radio frequency (RF) source, the method further comprising including data in the action signal, the data indicating that the RF source is to be energized when the cartridge is triggered, the interface module to send an RF-on signal to the RF source in response to receiving the action signal.

In an embodiment, the activation device further comprises: at least one of: a light source, and a radio frequency (RF) source, wherein the interface module is configured to receive a settings signal distinct from the action signal, the settings signal containing settings data that configure the activation device to send, in accordance with the settings data, at least one of: a light-an signal to the light source when the cartridge is triggered, and an RF-on signal to the RF source when the cartridge is triggered, the method further comprising providing the settings signal to the interface module.

In yet a further aspect, there is provided a method for refilling a military training cartridge comprising a refillable compressed gas compartment (RCGC); a refill valve connected to the RCGC; and a blast compartment, the method comprising the steps of: connecting a source of compressed gas to the refill valve; opening the refill valve to provide the compressed gas to the RCGC.

In an embodiment, the method further comprises emptying the blast compartment of any material present therein; and subsequently filling the blast compartment with fresh material.

In an embodiment, the method further comprises removing any portion of broken burst disc present in or attached to the blast compartment; and block the blast compartment by installing an integral burst disc in the blast compartment.

In an embodiment, the fresh material includes at least one of: powder, fake blood, tracer rounds, moulage parts, projectiles and scent compounds, and wherein filing the blast compartment with fresh material includes filing the blast material with at least one of the powder, fake blood, tracer rounds, moulage parts, projectiles and scent compounds.

In yet a further aspect, there is provided a training device for combat, the device comprising a light source; and an interface module configured to receive an action signal from a signal source and to send a light-on signal to the light source in response to receiving the action signal.

In an embodiment, the action signal includes data indicating that the light source is to be energized.

In an embodiment, the training device further comprises a radio frequency (RF) source, wherein the action signal includes data indicating that the RF source is to be energized, the interface module to send an RF-on signal to the RF source in response to receiving the action signal.

BRIEF DESCRIPTION OF THE FIGURES

FIG. 6 shows a cut-away view of the cartridge of FIG. 1 when the trigger and the piston are pushed to reset and re-seal the previously detonated cartridge.

FIG. 7 shows a cut-away view of the cartridge of FIG. 1 when the cartridge is reset in the sealed configuration, ready for re-pressurization.

FIG. 11 shows a cut-away view of the cartridge of FIG. 8 when the trigger and the piston are pushed to seal the now detonate cartridge.

FIG. 12 shows a cut-away view of the cartridge of FIG. 1 in the sealed configuration.

FIG. 15 shows a cut-away view of a training grenade having a cartridge in accordance with the present disclosure, with the cartridge in a sealed configuration.

FIG. 16 shows a cut-away view of the training grenade of FIG. 15 after detonation of the cartridge with a visual modification (VISMOD) housing attached; and an activation mechanism in an open configuration.

FIG. 29 shows cartridges in accordance with embodiments of the present disclosure.

DETAILED DESCRIPTION

Figure 1:
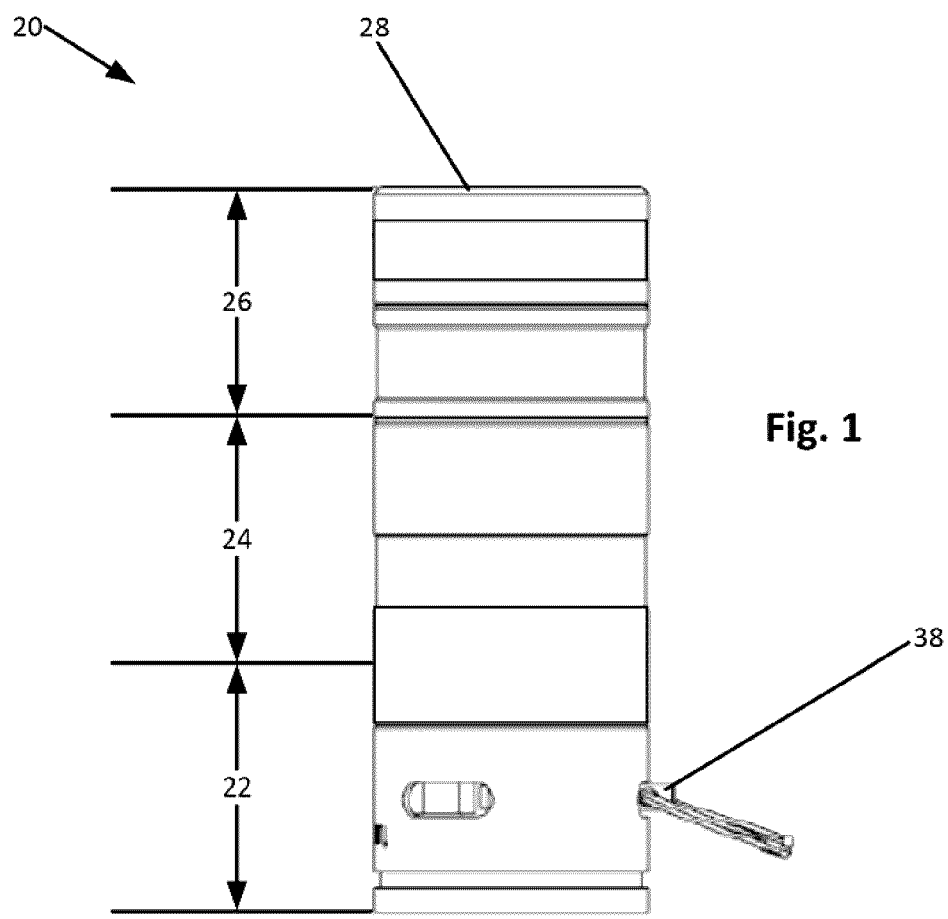
FIG. 1 shows a side elevation view of an embodiment of a cartridge in accordance with the present disclosure.

The present disclosure provides a safe, easy-to-use, convenient, reusable, versatile and environmentally friendly non-pyre cartridge and activation mechanism that can be used to generate physical and digital battlefield effects in military training. The present disclosure further provides military training devices that include, in addition to cartridges, cartridge activation mechanisms with optional modular communication assemblies, and cartridge refill, delivery and lifecycle management tools.

Embodiments of the present disclosure can generate physical and digital effects on the battlefield that safely and realistically simulate anti-tank weapon signatures, mortar weapon signatures, landmines signatures, improvised explosive device (I.E.D) weapon signatures, artillery point of impact signatures, hand grenade signatures, weapon impact signatures on vehicles, weapon impact signatures on buildings, multiple types of battlefield effects, weapon signatures, impact signatures with a single device type (e.g. non pyro cartridge).

Further, embodiments of the present disclosure can increase military training effectiveness and lower cost in that it is possible to deliver high volume of physical battlefield effects with a small logistical footprint and lower cost, to increase training effectiveness by reducing invasive personnel required for emplacement, and to operate and resupply battlefield effects hardware "in the field".

The cartridge of the present disclosure has a refillable compressed gas compartment that provides compressed gas to a blast compartment when the cartridge is activated. After detonation, the empty cartridge can be easily refilled, on the training grounds without requiring disassembly of the cartridge. The versatile blast compartment can contain various compound types and mixtures such as non-combustible powder, projectiles, liquids and/or olfactory particles and be closed by a burst disc. Upon the compressed gas rushing into the blast compartment, the burst disc breaks under the pressure of the gas and the contents stored in the blast compartment rushes out, providing realistic simulation of physical effects in the training environment, such as weapon signature simulation, battlefield effects, and casualty effects through audio, visual, concussive, haptic and/or olfactory cue. The refillable compressed gas compartment has a refill valve to which a compressed gas source can be easily connected in order to refill the refillable compressed gas compartment, as well as overflow vents for safety and efficiency of consistent pressurization. The burst compartment can be refilled with various contents and a new burst disc can be installed without disassembling the cartridge.

The cartridge activation mechanism can take many forms, such as attachments (e.g. replica munition round, replica hand grenade fuse system, etc.), cradles or training devices containing any type of activation mechanisms (e.g. electric and/or mechanical) that act as triggers for cartridge detonation (physical effects) and/or transmission/reception of battlefield event data. In some embodiments, the activation mechanism can be configured with modular communication assemblies to generate and receive data that, along with physical effects, to increase the realism in the training environment, during exercise events such as, for example, simulated weapon engagements (e.g. indirect and direct fire) The data that is generated/received can be used for exercise control, entity tracking and management (e.g. personnel, vehicles), preparation of meaningful after action reviews (e.g. interactive and objective feedback to the training audience) and interoperability with virtual and constructive simulation platforms.

The cartridge activation mechanism can be configured for either one-way or two way communication of data signals, such that it can transmit data signal and act upon other entities in a training environment, but not be acted upon (e.g. one-way), or, transmit and receive data signals to act upon the entities and be acted upon in the training environment. Within the training environment, the data signals set the conditions for the training events and enable management of the exercise through one-way or two-way data transfer of: device operational event data (e.g. weapon engagement data, such as direct or indirect fire, explosion of landmines, medical treatment or repair actions on mechanical entities or buildings, impact by wide-area events like chemical attack or nuclear attack, use of ammo tables, ballistic tables for trajectory calculations, weapon fire modes), device administrative event data (e.g. rest or re-calibrated devices, tampering with devices for cheating, cut of cartridges or ammo, generating audio and/or visual cues, device malfunction, device broken by player or taken out of play by referee, battery information), device position event data, (e.g. 2-D GPS location indoors/outdoors, 3-D position location in specified area such as building, speed or movement data), device player ownership data (e.g. linking equipment to players, player identification), and/or device identity data (e.g. device unique identifier, network address, etc.).

Relative to the activation mechanism, these modular communication assemblies may be configured to function as either a one-way or two-way data communication system, and may contain an interface module and/or microcontroller. The modular communication assembly serves the purpose of transmitting and/or receiving data using multiple telecommunication mediums (e.g. optical or radio frequencies) through parallel operation of different modules, interfaces, communication protocols and/or message sets simultaneously, or independently.

For example, an optical communication assembly may use single or multiple components for transmission and reception (e.g. laser transmitters/receivers, infrared diode transmitter/receivers), with fixed and/or software-defined reprogrammable configuration of hardware interface operational variables such as, but not limited to: pulse wavelengths, light sensitivity, detection of reflected laser light, pulse interval frequency, pulse interval type (e.g. fixed non-altering, altering and continuously changing pulse interval types), scanning timing for message characteristics (e.g. using real-time and/or short time scanning). The optical communication assembly may also use multiple component types (e.g. embedded memory technology) to support encoding/decoding activities protocol, formula, rules and methodology for operational variables such as: pulse interval types, message items, optical code structure message item sequences and types (e.g. short-time group structure, triplet group structure), interpretation of optical code type message sequence timing, interpretation of message set numbering sequences and formulas (e.g. for player Identity numbering, ammunition type numbering with a library of hundreds of weapons platforms, position code numbering to determine projectile positioning, distance lethality code numbering for ammunition types, code numbering for detonation characteristics of ammo, calculating burst of fire).

In other embodiments, an RF communication assembly may use single or multiple components for transmission and reception (e.g. frequency discriminators, frequency synthesizers, antennas, modulators/demodulators, oscillators, amplifiers, filters, frequency converters, phase detectors, repeaters, down/up converters), with software-defined, reprogrammable configuration of hardware interface operational variables such as: long range interfaces (e.g. <10 km, transmission of administrative events, operational events, position events), short range interlaces (e.g. 0 to 100 m, transmission of operational events locally, area weapons engagement data), communication type (e.g. broadcast-one to multiple and/or point-to-point-one-to-one).

In conjunction with the activation mechanism, modular visual stimulus assemblies (LED rings) can also be used, along with modular artificial stimulus communication assemblies than can transmit and/or receive battlefield information for outdoor or indoor augmented reality systems.

The refill, delivery, and lifecycle management equipment in accordance with the present disclosure allow quick, easy, non-messy, safe, refill of consumables used to generate physical effects and recharge of cartridge compressed gas power source. The refill, delivery and lifecycle management equipment requires no advanced special technical vocational training, or formal education requirement, or federal/local licensing required compared to other hazardous, combustible, pyrotechnic fireworks-based battlefield effects products. Disposal of expended consumables used to generate physical effects require no special waste handing or environmental considerations. The refill equipment and tools of the cartridge compressed gas compartment and consumables, can be used both outdoors "in the field" on all types of terrain, climates and weather conditions and indoors for large quantity mass refill operations at customer-provided warehouse or depot level.

Additionally, to overcome logistical, transportation and regulatory constraints for large scale military training exercises, refill and delivery equipment can be configured for deployment as a self-sustaining mobile warehouse offering 24 hour on-site service, operation and management for high volume processing and supply of cartridges, training devices, and modular communication assemblies. For deployment, the mobile warehouse has no special transportation restrictions (e.g. shipping of hazardous materials), no special environmental considerations or waste disposal requirements (e.g. disposal of hazardous materials or expended traditional ammunition). The mobile warehouse can include tools, jigs, fixtures, test and diagnostic equipment for mass refill/recharge activities, field delivery, repair activities, spares and replacement components, calibration of physical and digital effects hardware (e.g. 'sighting in' line of sight optical communications assembly), data-communications network diagnostic equipment.

Field refill equipment for re-pressurizing cartridges can include mobile gas sources, pressurized cylinders, with quick fill adapters that allow operators to easily attach to cartridge refill valves, while providing consistent and reliable pressurization. Field refill equipment for the multiple consumable types used to customize physical effect generation (e.g. liquid, compounds, mixtures, props) includes specialized storage containers, compound mixing devices, refill jigs, funnels, etc. Field lifecycle and operational management equipment includes tools for alignment and calibration of line-of-sight and non-line-of-sight communication modules (e.g. optical, directional RF), reprogramming and/or reset tools for data communication (i.e. reprogramming message sets, reset training device entity status information).

Depot or warehouse refill equipment for re-pressurizing cartridges can include custom manifolds attached to air compressors with quick fill adapter tools that allow quick and easy attachment to single or multiple cartridge refill valves for mass refill activities while providing consistent and reliable pressurization of cartridge compressed gas compartment. The refill equipment for re-pressurization can also include fixtures, packaging tools, and workstations.

Depot or warehouse refill equipment for multiple consumable types used to customize physical effect generation (e.g. liquid, compounds, mixtures, props) can include workstations, custom storage containers, mixing devices (e.g. colour powder mixers), refill jigs, funnels, semi-automated and manually operated devices for filling blast chambers with alternating content type, semi-automated and manually operated devices for installing multiple types of burst disks, and packaging devices for filling blast chambers without use of burst disk.

Additionally, depot or warehouse delivery and lifecycle management equipment can include: customized tools for low-volume 'on-demand' fabrication and assembly of VISMODs for attachment to, or placement with, cartridges, activation mechanisms, and communication modules including, but not limited to, plastic or rubber or metal housing shaped and colour treated to resemble landmines, rocket propelled grenades, dummy ammunition, I.E.D, customized tools for 'on-demand' low-volume fabrication and assembly of mounting brackets for safe, permanent and/or non-permanent attachment or appending of VISMODS and cartridge activation mechanisms to personnel, military and civilian vehicles, aircraft, watercraft, buildings, other training devices, weapon simulators, dummy ammunition, whereas mounting brackets are fabricated using multiple material types such as fabric (e.g. for personnel worn attachment), plastics, metals, wood; custom hand tools for low-volume fabrication and assembly of cable harnesses (e.g. wiring assembly) and installation of connector housings (e.g Amphenol plug and socket connectors), used for crimping, fastening, taping, mounting, cutting plugging, soldering, twisting hand tools; devices and software for alignment and calibration of line-of-sight and non-line-of-sight communication modules (e.g. optical, directional radio frequency), reprogramming and/or reset tools for data communication; custom tools for repair of electronics equipment.

Refill equipment and tools can also allow for quick, easy, efficient, non-messy refill of the cartridge blast chamber for multiple content types such as "effects" powder, liquids and projectiles such as dirt and debris, fake blood, moulage projectiles, scent compounds, etc.

In the context of the present disclosure, the term "VISMOD" is to be understood as meaning visual modification of device embodiment for resemblance and replicated functionality in relation to military weapons. VISMODs of the cartridge of the present disclosure include fixed and non-fixed attachments, modules and components, along with removable or non-removable modular external housing that allow the cartridge, activation mechanism, or communication assemblies to resemble and replicate munitions and functions of the munitions.

FIG. 1 shows a side elevation view of an embodiment of non-pyro cartridge 20 in accordance with the present disclosure. The cartridge 20 can be referred to as a push-to-release cartridge or as a pressure applied cartridge in the sense that, as is explained below, the trigger of the cartridge needs to be pushed in order for the cartridge 20 to detonate. The cartridge 20 comprises a trigger module 22, a refillable compressed gas compartment (RCGC) 24, a blast compartment 26 and a burst disc 28, which is part of the blast compartment 26. The RCGC 24 can also be referred to as a compressed gas (or air) chamber. The blast compartment 26 can also be referred to as a non-pyro powder chamber.

Figure 2:
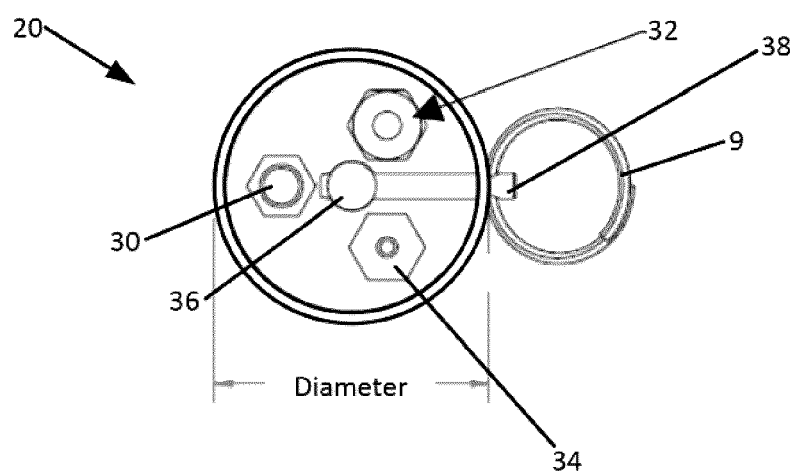
FIG. 2 shows a bottom view of the cartridge of FIG. 1.

FIG. 2 shows a bottom view of the cartridge 20. As shown in FIG. 2, the cartridge 20 includes a refill valve 30, a pressure relief valve 32 a pressure status indicator 34. The pressure relief valve 32 and the pressure status indicator 34 are optional. The refill valve 30 is connected to the RCGC 24 and is configured for introducing gas into the RCGC 24. The refill valve 30 can be any suitable type of valve that allows for connection to a compressed gas source. Any suitable type of gas can be used without departing from the scope of the present disclosure (e.g., air, Nitrogen, $CO_2$, etc.)

The pressure relief valve 32 is configured to vent the gas present in the RCGC 24 outside the compressed air chamber 24 when the pressure of the gas inside the RCGC 24 exceeds a predetermined air pressure value. As such, the pressure relief valve 32 is a safety valve that prevents pressure in the RCGC 24 from exceeding a safe value, beyond which the cartridge 20 may detonate accidently or become damaged, e.g. with the excessive pressure in the RCGC damaging the refill valve 30 or other parts of the cartridge 20. Any suitable type of pressure relief valve can be used without departing from the scope of the present disclosure. For example, any suitable type of spring-loaded pressure relief valve can be used. In some embodiments, the operating pressure of the cartridge 20 can vary from 50 psi to 1800 psi and the pressure relief valve 32 can be selected to open when the pressure inside the RCGC 24 exceed the operating pressure.

The pressure status indicator 34 is optional and can be any suitable device operationally connected to the RCGC 24 that can indicate visually and/or haptically when the RCGC 24 is filled with compressed gas to the operating pressure. For example, a visual pop-up pressure indicator can be used as the pressure status indicator 34. This allows the user of the cartridge 20 to deploy the cartridge 20 confidently, knowing that it is operational.

FIG. 2 further shows a trigger 36 and, FIGS. 1 and 2 also show a lock pin 38 that, when in the installed position, as shown in these FIGS., interferes with the trigger 36 and prevents the trigger 36 from being pushed and the cartridge from being activated. A pull ring 9 is connected to the lock pin 38 to allow a user to easily pull out the lock pin.

Figure 3:
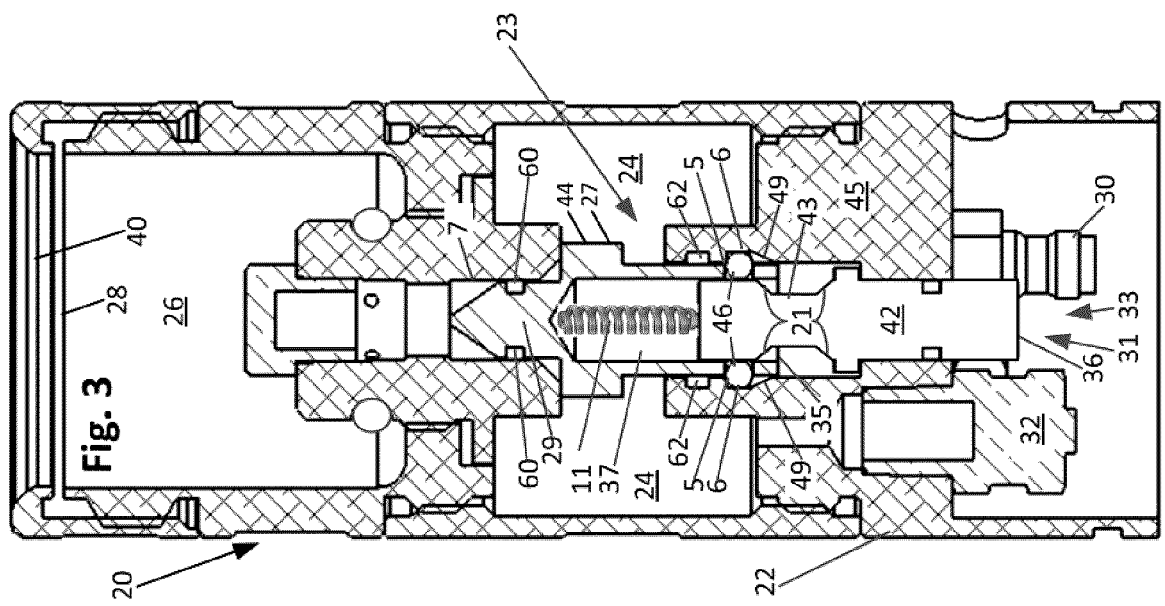
FIG. 3 shows a cut-away view of the cartridge of FIG. 1 in an armed state, with safety pin removed, in a sealed configuration, pressurized and ready for detonation.

FIG. 3 shows a cut-away view of the cartridge 20 of FIG. 1, without the lock pin installed. This is considered the armed state of the cartridge, in a sealed configuration, pressurized and ready for detonation. FIG. 3 shows the burst disc 28 that closes an aperture 40 of the blast compartment 26, which can contain any suitable content types of powder, liquid, projectiles, compounds such as, for example, talcum powder, fake liquid blood, etc. The burst disc 28 is optional in the sense that the blast compartment 26 will generate some level of sound when the cartridge 20 is activated. In some applications which prioritize visual or haptic stimulation over audible cues, projectiles and/or debris such as marking rounds, dust, moulage chunks, etc. are present in the burst chamber without the use of a burst disk. The powder is optional and required only is simulations where smoke is needed.

FIG. 3 also shows the RCGC 24 and the trigger module 22. FIG. 3 further shows a conduit 7 that extends from the RCGC 24 to the blast compartment 26. The trigger module 22 has a valve mechanism 23 that operationally connects the RCGC 24 to the blast compartment 26. In the context of the present disclosure, operationally connected is to be understood as meaning that a change in the configuration of the valve mechanism either seals the RCGC 24 from the blast compartment or, unseals the RCGC 24 from the blast compartment 26. Generally, elements can be said to be operationally connected when an action in, or state of, one element can be controlled by, or related to, an action in, or a state of, another element.

In the example of FIG. 3, the valve mechanism 23 includes a stopper 44 that has a stopper body 27 and a seal end 29. The valve mechanism 23 includes a release mechanism 31, which, in this embodiment, is a push-to-release mechanism 33.

In FIG. 3, the valve mechanism, the stopper 44 blocks the conduit 7, prevent gas in the RCGC 24 from transferring from the RCGC 24 to the blast compartment 26. This configuration of the valve mechanism 23 can be referred to as a sealed configuration (the RCGC 24 is hermetically sealed from the blast compartment 26). In the sealed configuration, it is the seal end 29 that blocks the conduit 7. The seal end 29 can have a seal 60 positioned between the stopper body 27 and the inner wall of the conduit 7, when the valve mechanism 23 is in the sealed configuration.

The push-to-release mechanism 33 includes the stopper 44, which defines a cylinder 37 and, at an end opposite the seal end 29, a cylinder opening 35. A piston 42 is sized to fit in the cylinder opening 35, and to move along, the cylinder 37. The piston 42 is thus movably engaged in the cylinder 37. The cylinder 37 can house a biasing means such as, for example, a spring 11 configured to bias the piston 42 outwardly of the cylinder 37 when the piston 42 is pushed inwardly. The push-to-release mechanism 33 also comprises bearing elements 46, which can be, for example, ball bearings. There can be any suitable number of bearing elements 46: some embodiments can have one, others two or four, etc. The bottom end of the piston 42 is the trigger 36, which is configured for pushing the piston 42 toward the stopper 44 when the trigger 36 receives a force.

In FIG. 3, the RCGC 24 is filled with compressed air. The seal 60, located at the seal end 29 of the stopper 44 prevents compressed air from flowing into the blast compartment 26 through the conduit 7, which can also be referred to as a channel, opening, etc. Another seal, seal 62, prevents the compressed air from flowing from the RCGC 24 into the trigger module 22. The seals 60 and 62 can be any suitable type of seals such as, for example, O-ring seals. Further, in the seal configuration shown at FIG. 3, the bearing elements 46 are located partly in apertures 5 defined by the stopper body 44 and partly in recesses 6 defined in a base portion 45 of the RCGC 24. This arrangement of the bearing elements 46, in the sealed configuration of FIG. 3, prevents any movement of the stopper 44 with respect to the blast compartment 26 and thus, prevents compressed air from the RCGC 24 from flowing into the blast compartment 26.

The base portion further defines a passageway 99 in which the stopper body 44 can slide. The stopper is thus slideably engaged in the passageway 99. The passageway 99 is shown at FIG. 4.

Referring now back to FIG. 3, the end portion 101 (FIG. 4) that has a diameter that is larger than the diameter of the neck 43. The stopper body 44 and the piston 42 have cooperating elements that releasably lock the stopper body in the passageway 99 when the valve is in the sealed configuration. In the present embodiment, the cooperating elements are the recesses 6, the apertures 5 and the bearing element 46. In the seal configuration, the bearing elements 46 are positioned against the end portion 101 the piston 42, the bearing elements 46 are also partially positioned in the apertures 5 of the stopper body 44 and partially positioned in the recesses 6 of the passageway 99, thereby locking the stopper body 44 in the passageway 99.

Figure 4:
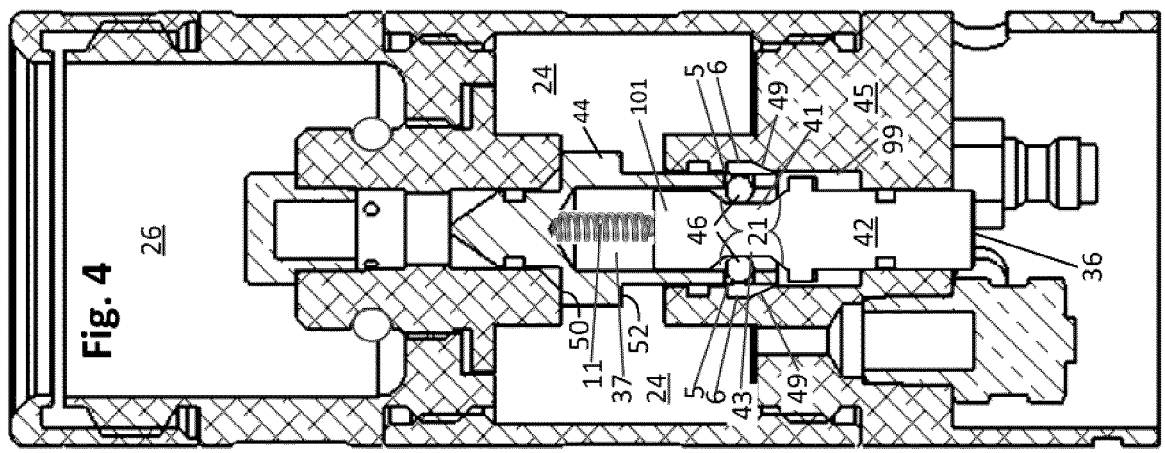
FIG. 4 shows a cut-away view of the cartridge of FIG. 1 when the trigger and the piston have been pushed to detonate the cartridge and the cartridge is an activation and detonation stage.

FIG. 4 shows a cut-away view of the cartridge 20 when the trigger 36 and piston 42 have been pushed inwardly to activate the cartridge 20. This is considered the activation state to initiate detonation of the cartridge 20. In the intermediary configuration shown in FIG. 4, the piston 42, which, in this embodiment, defines an hourglass section 41 that has a neck 43, has been pushed in the cylinder 37 such that the neck 43 of the piston (the narrowest portion of the piston 42) is in alignment with the bearing elements 46. The neck 43 is flanked by ramps 21 that extend from the neck towards the outer portion of the piston 42.

When the piston is pushed up, the bearing 46 move out of the recesses 6, and into the space between the ramps 21. That is, when the neck 43 and the bearing elements 46 become aligned, the bearing elements 46 move inward toward the neck 43, and out of the recesses 6. In this intermediary configuration, the piston 42 is no longer locked to the stopper 44. As the bearing elements no longer lock the stopper 44 to the base portion 45, the stopper 44 (and the piston 42 to which it is now locked) can move with respect to the base portion 45 to unseal the blast compartment 26 from the RCGC 24. That is, the stopper body 44 becomes unlocked from the base portion 45 when the piston 42 is subjected to a push toward the inside of the cylinder 37 (cylinder cavity) to align the neck portion 41 of the piston 42 with the bearing elements 46, thereby causing the bearing elements 46 to move out of the recesses 6 and toward the neck portion 41 to allow movement of the stopper body 44 in the passageway 99.

In the intermediate configuration shown at FIG. 4 (and also in the sealed configuration shown at FIG. 3), the shoulder portion 50 of the stopper 44 is under pressure from compressed air present in the RCGC 24. This pressure exerts a downward force on the stopper 44. The compressed air also exerts a pressure on the shoulder 52 of the stopper 44. This pressure exerts an upward force on the stopper 44. As the surface area of the shoulder 50 is larger than the surface area of the shoulder 52, the stopper 44 is subjected to a resultant force that pushes the stopper 44 (and the piston 42 to which it locked) downward. The bearing elements 46 are biased towards the neck 43 when the cylinder body 44 is pushed down. This is due to recesses 6 having a rearward ramp 49 that forces the 46 bearing elements to move inward toward the neck 43 of the piston 42 as the stopper 44 moves downward.

Figure 5:
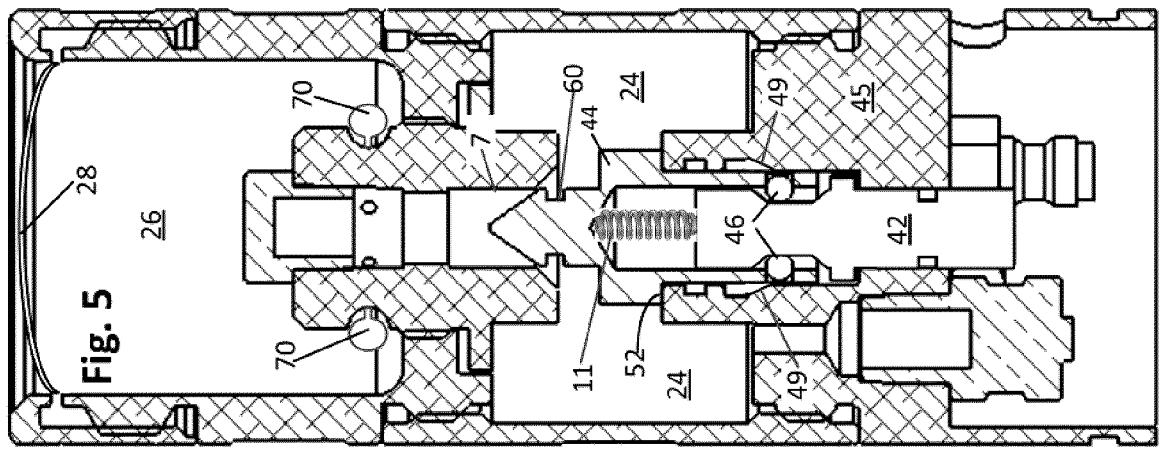
FIG. 5 shows a cut-away view of the cartridge of FIG. 1 after the cartridge has been detonated.

FIG. 5 shows an open configuration of the valve mechanism 23 where the stopper 44 and the piston 42 are pushed down with respect to the base portion 45. In this configuration the shoulder 52 of the stopper 44 abuts the base portion 45 and, the stopper 44 is locked to the piston 42. Further, as a result of the compressed air having pushed the stopper 44 downward, the seal 60 is out of the conduit 7 and the compressed air flows into the blast compartment 26. This causes the burst disc 28 to burst under the pressure of the compressed air rushing into the blast compartment 26 from the RCGC 24. This is considered the detonation state of the cartridge 20. The bursting of the burst disc 28 causes an audible cue and haptic cue. Further, when the blast compartment 26 contains powder, liquids or debris, the bursting of the burst disc 26 under the air pressure causes the contents to be dispersed which provides a visual cue and feedback.

FIG. 6 shows the cartridge 20 in a post-detonation state, with the piston 42 up in the cylinder 37 after being pushed toward the stopper 44 and with the seal 60 located inside the conduit 7. When moved inward, a shoulder 65 of the piston abuts the stopper 44, which causes the stopper 44 to be pushed inwards. For resetting the cartridge 20, a biasing means, for example, the spring 11, located in the cylinder 37 pushes against the piston 42 to move the piston back to the initial position of FIG. 3 also shown In FIG. 7. The spring 11 (biasing means) is configured to push against the piston 42 and to move the piston 42 with respect to the stopper body 44 and toward an outside of the cylinder cavity 37 when the piston 42 is released after having been pushed toward the inside of the cylinder cavity 37.

Once in the sealed configuration shown at FIG. 7, the cartridge is considered in a state of reset and ready for re-pressurization the cartridge is considered in a state of reset and ready for re-pressurization. A compressed air source (not shown) can be connected to the refill valve 32 and compressed air can be introduced into the RCGC 24 to refill the RCGC 24. Further, new contents and a new burst disc can be installed in/on the burst compartment 26, and the cartridge 20 reused.

Referring back to FIG. 5, the blast chamber 26 has a displaceable closure 70, which, under pressure from the air entering from the compressed air chamber 24, moves outwards (expands outwards) to let air in the blast chamber 26. The displaceable closure 70 prevents powder from entering the conduit 7 and the RCGC 24. As a non-limiting example, the displaceable closure 70 can be a highly saturated nitrile O-ring.

Figure 10:
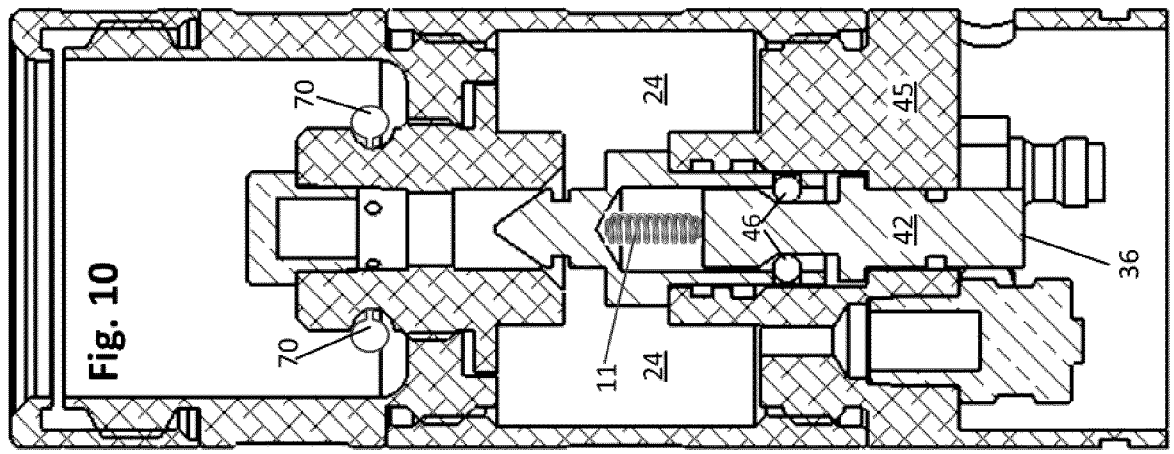
FIG. 10 shows a cut-away view of the cartridge of FIG. 8 after the cartridge has been detonated.
Figure 9:
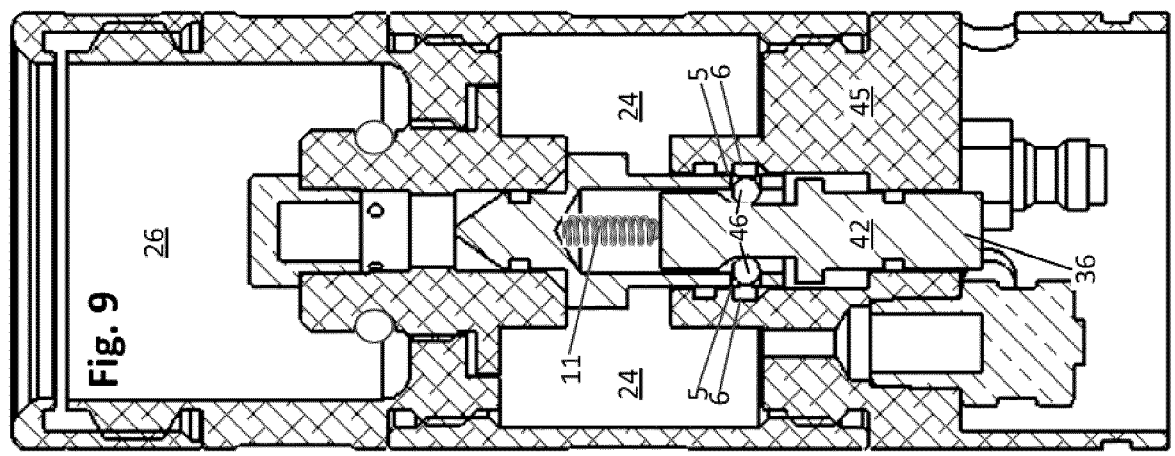
FIG. 9 shows a cut-away view of the cartridge of FIG. 8 when the trigger and the piston have been pushed to detonate the cartridge.
Figure 8:
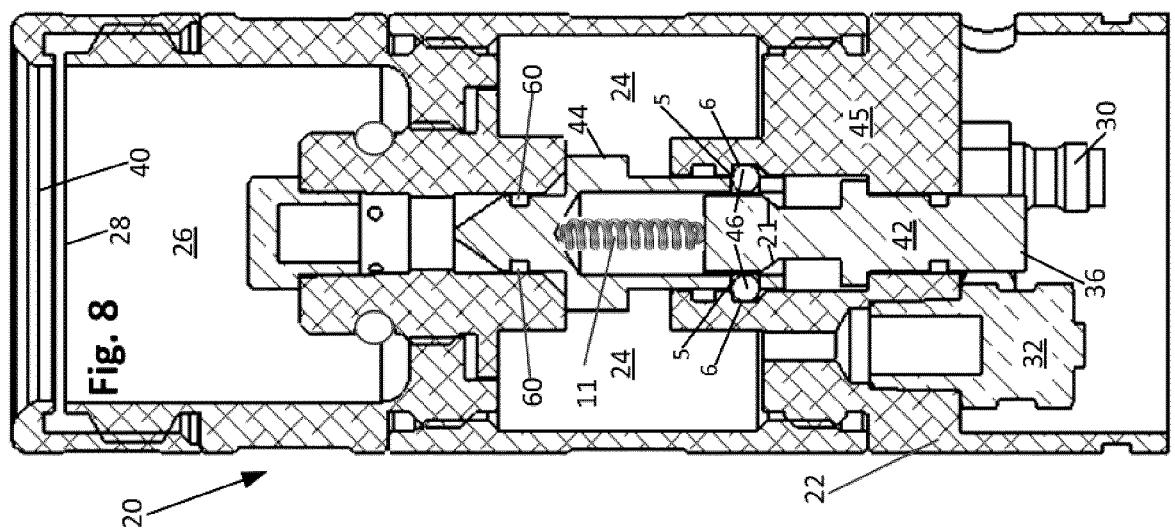
FIG. 8 shows a cut-away view of another embodiment of a cartridge in accordance with the present disclosure, in a sealed configuration.

FIGS. 8-12 shows a further embodiment of the non-pyre military training cartridge in accordance with the present disclosure. The cartridge 20 of FIG. 8 has a push-to-release valve mechanism similar to that of the cartridge shown in the embodiment of FIGS. 3-7. However, in the cartridge 20 of FIG. 8, the piston 42, rather than having a neck flanked by two ramps, there is only one ramp 21 and, the recesses 6 are shaped as square slots without ramps extending toward the piston 42. In this embodiment, the depth and the diameter of the recesses 6, the diameter of the bearing elements 46 and the diameter of the apertures 5 of the cylinder body 44 are selected (designed) such that the bearing elements 46 move inwards toward the ramp 21 and out of the recesses 6 as the piston 42 is pushed up, as shown in FIG. 9. FIG. 10 shows the cartridge 20 in the open configuration with the piston 42 at its lowest position, causing detonation and expulsion of contents from the blast compartment 26. FIG. 11 shows the piston 42 pushed up as far as possible in order to return the cartridge 20 to the sealed configuration. In FIG. 11, the bearing elements 46 are each aligned with their respective recess 6 and, as the piston is pushed downward by the biasing element 11 disposed in the cylinder 37, the bearing elements 46 are pushed into their respective recesses 6 by the ramps 21 and the cartridge 21 is ready for being refilled with compressed gas at FIG. 12.

Figure 13:
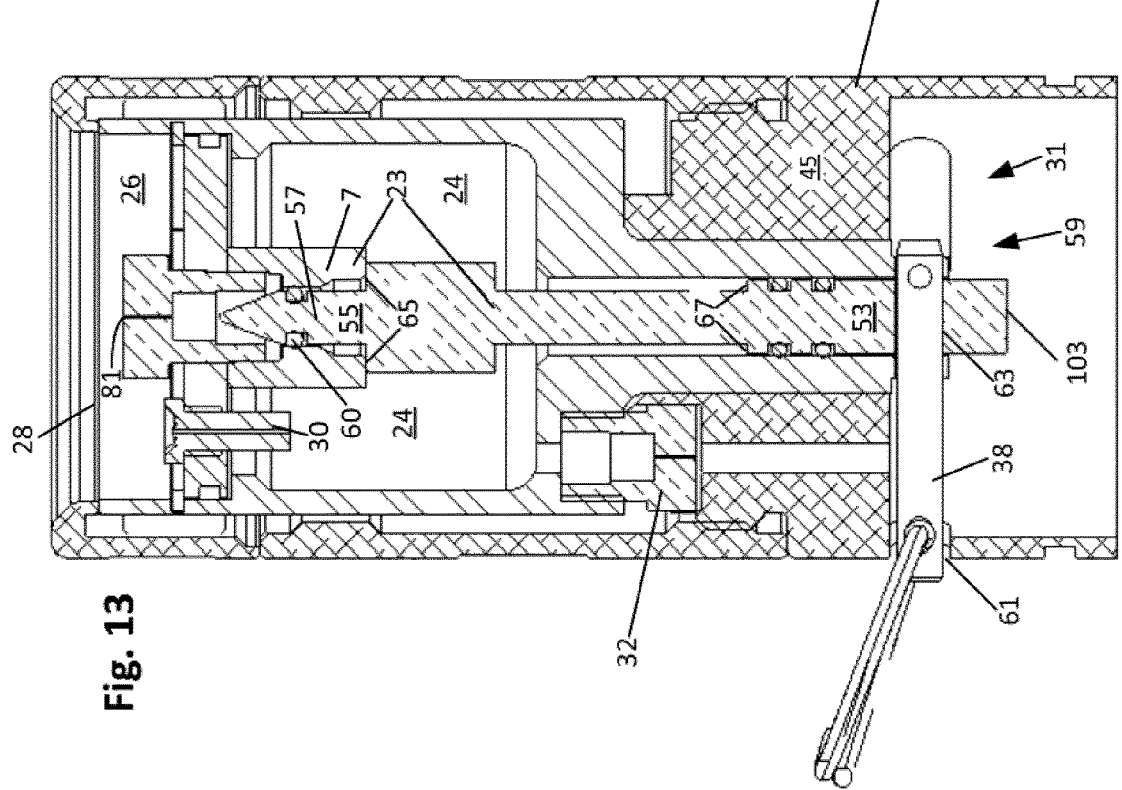
FIG. 13 shows a cut-away view of yet another embodiment of a cartridge in accordance with the present disclosure, in a sealed configuration.

FIG. 13 shows another embodiment of the non-pyro military training cartridge in accordance with the present disclosure. The cartridge 20 of FIG. 13 can be referred to as pressure release cartridge in the sense that, as is explained below, pressure on the trigger needs to be released in order for the cartridge 20 to detonate.

The cartridge 20 of FIG. 13 has a trigger module 22, an RCGC 24, a blast compartment 26 and a burst disc 28, which is part of the blast compartment 26. The cartridge 20 further comprises a refill valve 30 and, optionally, a pressure release valve 32. The pressure relief valve 32 is a safety valve that prevents pressure in the RCGC 24 from exceeding a safe value, beyond which the cartridge 20 may detonate accidently or become damaged, e.g. with the excessive pressure in the RCGC 24 damaging the refill valve 32 or other parts of the cartridge 20. Any suitable type of pressure relief valve can be used without departing from the scope of the present disclosure. For example, any suitable type of spring-loaded pressure relief valve can be used. In some embodiments, the operating pressure of the cartridge 20 can vary from 50 psi to 1800 psi and the pressure relief valve 32 can be selected to open when the pressure inside the RCGC 24 exceed the operating pressure. The cartridge 20 can optionally comprise a pressure status indicator as described in relation to the embodiment of FIG. 2. The refill valve 30 is connected to the RCGC 24 and is configured for introducing gas into the RCGC 24. The refill valve 30 can be any suitable type of valve that allows for connection to a compressed gas source. Any suitable type of gas can be used without departing from the scope of the present disclosure (e.g., air, Nitrogen, $CO_2$, etc.).

FIG. 13 further shows a shaft 53 and a lock pin 38. When in the installed position, as shown in FIG. 13, the lock pin 38 prevents the cartridge 20 from detonating.

FIG. 13 also shows the burst disc 28 that closes the aperture 40 of the blast compartment 26, which can contain any suitable content type such as, for example, talcum powder, fake liquid blood, etc. The burst disc 28 is optional in the sense that the blast compartment 26 will generate some level of sound when the cartridge 20 is activated and that, in some applications, the sound level generated without the burst disc 28 installed may be adequate. The powder is optional and required only is simulations where smoke is needed. FIG. 13 further shows a conduit 7 that extends from the RCGC 24 to the blast compartment 26. The cartridge 20 has a valve mechanism 23 that operationally connects the RCGC 24 to the blast compartment 26.

In the embodiment of FIG. 13, the valve mechanism 23 includes the shaft 53 that defines a stopper 55, which has a seal end 57. The valve mechanism 23 includes a release mechanism 31, which, in this embodiment, is a pressure release mechanism 59.

In FIG. 13, the stopper 55 blocks the conduit 7 (the stopper is in a lock position), thereby preventing gas in the RCGC 24 from transferring from the RCGC 24 to the blast compartment 26. This configuration of the valve mechanism 23 can be referred to as a sealed configuration (the RCGC 24 is hermetically sealed from the blast compartment 26). In the sealed configuration, it is the seal end 57 that blocks the conduit 7. The seal end 55 can have a seal 60 positioned between the stopper 55 and the inner wall of the conduit 7, when the valve mechanism 23 is in the sealed configuration. Even though the surfaces 65 of the shaft 53 are abutted against the bottom of the conduit 7, they are not sealed from the compressed gas present in the RCGC 24. Rather, the surfaces 67 are subjected to the gas pressure in the RCGC 24.

In FIG. 13, the pressure release mechanism 59 includes the shaft 53, the stopper 55 and the lock pin 38. When pressurized and in the sealed configuration, the cartridge 20 is considered to be in an armed state as the valve mechanism 23 is locked in place by the lock pin 38 interfering with the lock end 103 of the shaft 53. To do so, the lock pin 38 is inserted in the pin aperture 61 defined by the trigger module 22 and in the shaft aperture 63 defined by the shaft 53. To release the valve mechanism 23 and detonate the cartridge, the lock pin 38 is pulled out of the shaft aperture 63, as shown in FIG. 14.

Figure 14:
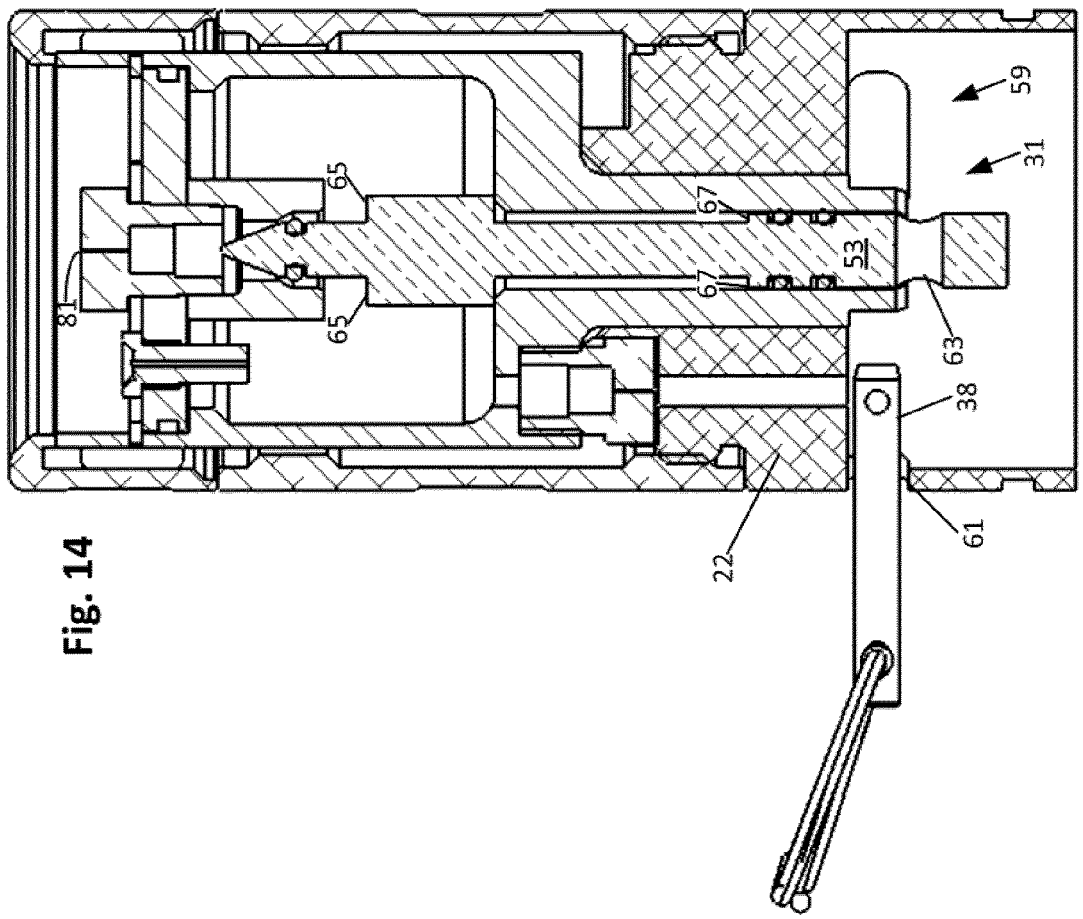
FIG. 14 shows a cut-away view of the cartridge of FIG. 13. after detonation of the cartridge.

FIG. 14 shows the cartridge 20 in an activated state after the lock pin 38 has been pulled out of the shaft aperture 63. In this FIG., the gas pressure in the RCGC 24 has pushed down the shaft 53 due to the gas pressure applied on the surfaces 65 and 67 of the shaft 53. In FIG. 14, the valve mechanism 23 is in the open configuration, which means that the RCGC 24 is in fluid communication with the blast compartment 26 (i.e., fluid such as gas can flow between the RCGC 24 and the blast compartment 26). As the valve mechanism 23 goes from the sealed configuration (FIG. 13) to the open configuration (FIG. 14), the compressed gas in the RCGC 24 rushes through the conduit 7 and into the blast compartment 26. This causes a sudden increase in pressure in the blast compartment 26, which causes the detonation of the cartridge 20 through rupture of the burst disc 28 (when the burst disc is installed). When powder is present in the blast compartment 26, the powder is dispersed in a plume when the blast compartment 26 receives the rush of compressed gas.

In the embodiment of FIGS. 13 and 14, compressed gas from the RCGC 24 flows into the blast compartment 26 through the conduit 7, which has a section 81 with a small displaceable closure 82.

In order to reuse the cartridge 20 of FIG. 14, the shaft 53 is pushed inward to place the valve mechanism 23 into the sealed configuration, the lock pin 38 is pushed back into the shaft aperture 63, the RCGC 24 is refilled with compressed gas and the blast chamber can optionally be filled with powder and capped with a burst disc 28.

In another embodiment of the cartridge of the present disclosure, the release mechanism of the embodiment of FIGS. 13 and 14 (lock pin 28 pulled out of shaft aperture 63 to release the shaft) can be replaced with a grenade-type release mechanism as shown in FIGS. 15 and 16, which shows a training grenade 400, which is a VISMOD of the cartridge of the present disclosure.

The training grenade 400 has a casing 199 that holds a cartridge 201, which has an RCGC 24 and a blast compartment 26, a burst disc 28, a shaft 53 and a seal 60, as in the embodiment of FIGS. 13 and 14. However, in the present embodiment, rather than having a lock pin maintaining the valve mechanism in the sealed configuration, the training grenade 400 has a hinge closure 402 that pushes against the shaft 53 and maintains the shaft 53 in place by having a locking pin 404 that locks the hinge closure 402 to the body 406 of the hinge closure 402. The hinge closure 402 has a pivot axis 403.

FIG. 14 shown the training grenade 400 after the locking pin 404 has been removed and when the hinge closure 402 has pivoted upward to release the shaft 53. The training grenade 400 is shown with its valve mechanism in the sealed configuration in FIG. 15 and with the valve mechanism in the open configuration in FIG. 16.

Figure 17B:
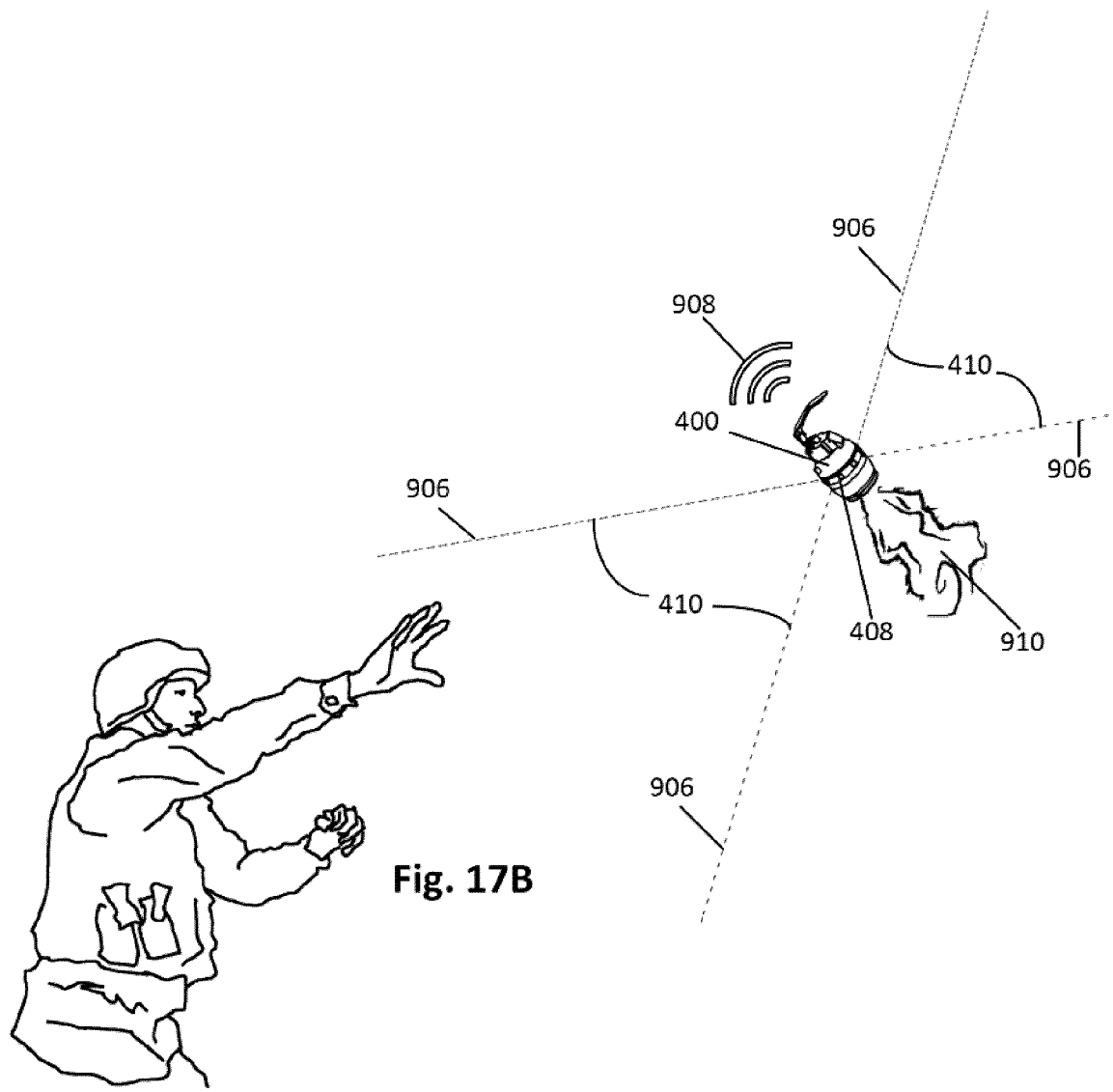
FIG. 17B shows a soldier launching the training grenade of FIG. 17A, with the training grenade shown midst detonating in an open configuration.
Figure 17A:
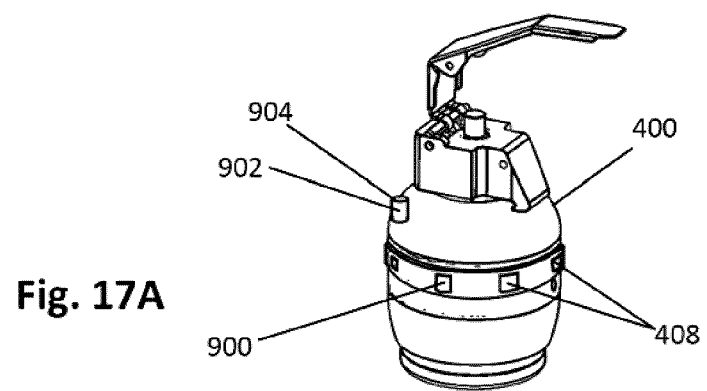
FIG. 17A shows another embodiment of a training grenade having a cartridge in accordance with the present disclosure, after detonation of the cartridge and in an open configuration.

FIG. 17A shows a top perspective view of a training grenade 400 equipped with optional modular light elements (or light sources) 408 (e.g., light emitting diodes), an optical communication assembly 900 (e.g. IR or infrared diodes) and a wireless communication assembly 902 (e.g. RF transmitter 904). The light elements 408, along with the wireless and optical communication assemblies are connected to an energy source (e.g. a battery—not shown) and microcontroller embedded in the training grenade 400. The light elements 408 are configured to emit light when the training grenade 400 detonates, and also aid the user in locating the device after it has been thrown. LEDs and infrared diodes can be embedded in a detachable, modular ring placed around the circumference of the training grenade enables laser based pulse-code modulation optical communication transmitting and receiving for real time, line of sight tactical engagement simulation and casualty effect assessment. An optional configuration of the VISMOD (not shown), embedded in the training grenade device, includes an activation mechanism that signals both optical and RF communication assemblies for parallel operation with different modules, interfaces, communication protocols and message sets simultaneously, to achieve transmission and translation of 'digital effects' data (e.g. weapon engagement data, device identity and ownership data, location data) into multiple 'digital languages' understood by different sensors, legacy and new training devices concurrently. The embedded wireless communication assembly enables transmitting and receiving of non-line-of sight tactical engagement simulation, casualty effect assessment, real time positioning, and other required event data, both short range and long range In another configuration (not shown), the training grenade has embedded communication assemblies enabling manual or automatic pairing to player identities within the training environment. FIG. 17B shows the training grenade 400 as it detonates and emits light 410, line-of-sight optical communication transmission 906, RF communication signals 908 and visual cue 910 (e.g. smoke powder effect) after having been thrown by a soldier.

As will be understood by the skilled worker, the cartridge of the present disclosure can be the subject of any suitable VISMOD. For example, the cartridge can be made part of a training grenade assembly as shown if FIGS. 15 and 16.

Figure 18:
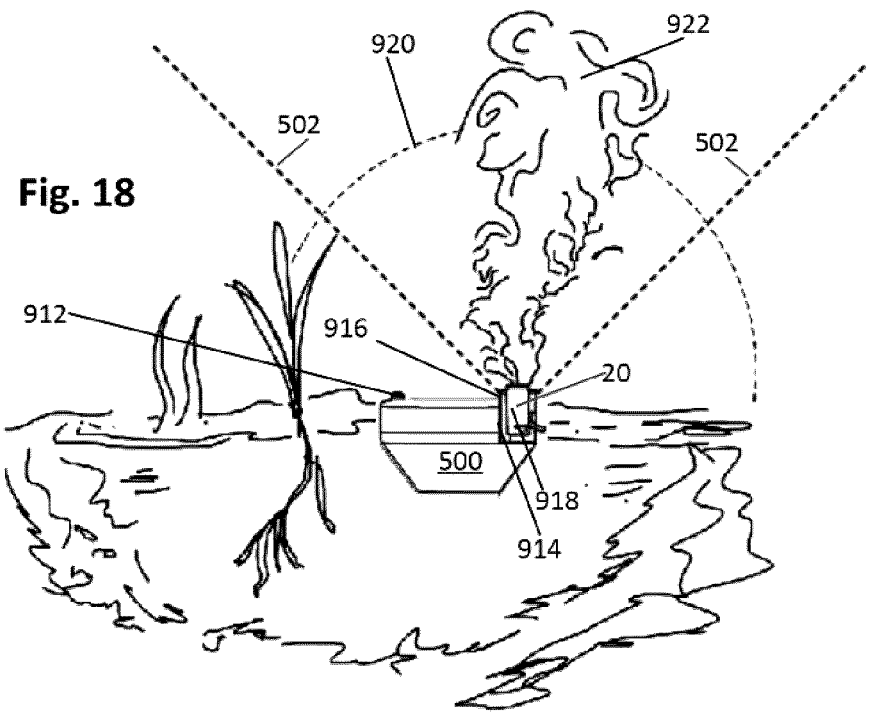
FIG. 18 shows a deployed landmine having a cartridge in accordance with the present disclosure.

In another example, the cartridge of the present disclosure can be made part of training landmine assembly to form a training landmine 500 as shown at FIG. 18. The training landmine 500 includes a casing 205 that holds the cartridge 20. The training landmine 500, shown as deployed in the field, can be fitted with optical and wireless communication assemblies, LEDs, microcontrollers and an energy source. FIG. 18 shows the training landmine 500 equipped with a wireless communication assembly 912 (e.g. an RF Antenna), an optical communication assembly 914 (e.g. laser diodes) and LEDs 916, which be embedded in a detachable, modular ring placed on top of a cartridge activation cradle 918. Both laser based pulse-code modulation optical communication and wireless RF communication transmitting and receiving enables real time, line of sight and non-line of sight tactical engagement simulation and casualty effect assessment. This allows trainees to engage landmines with both realistic physical effects (e.g. audio, visual, haptic, olfactory cues) from the cartridge 20 and realistic digital effects (e.g. laser emitted communication line-of-sight 502 from the VISMOD or cartridge activation assembly) embedded in the training landmine 500 to simulate blast patterns and damage received from real-life explosions. An optional configuration of the VISMOD (not shown), embedded in the training landmine device, includes an activation mechanism that signals both optical and RF communication assemblies for parallel operation with different modules, interfaces, communication protocols and message sets simultaneously, to achieve transmission and translation of 'digital effects' (e.g. weapon engagement, device identity and ownership data, location) data into multiple 'digital languages' understood by different sensors, legacy and new training devices concurrently. An RF communication signal 920 is shown at FIG. 18.

In FIG. 18, detonation and activation of the training landmine 500, triggers detonation and activation of the non-pyro cartridge 20 installed in cartridge activation cradle embedded in the landmine device. Physical effects such as light, sound, haptic and smoke effects 922 are produced by the non-pyro cartridge, in conjunction with digital effects produced by the embedded cartridge activation cradle such as wireless and optical transmission functions.

Figure 19:
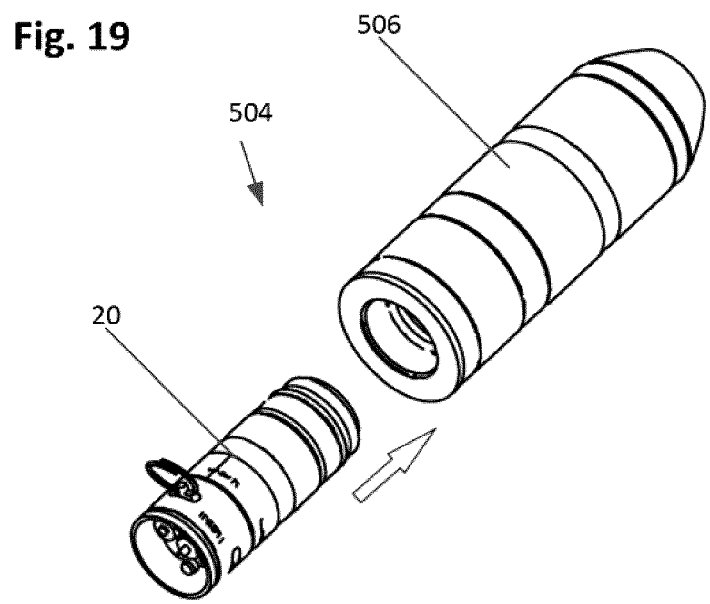
FIG. 19 shows a training mortar round having a cartridge in accordance with the present disclosure.
Figure 20:
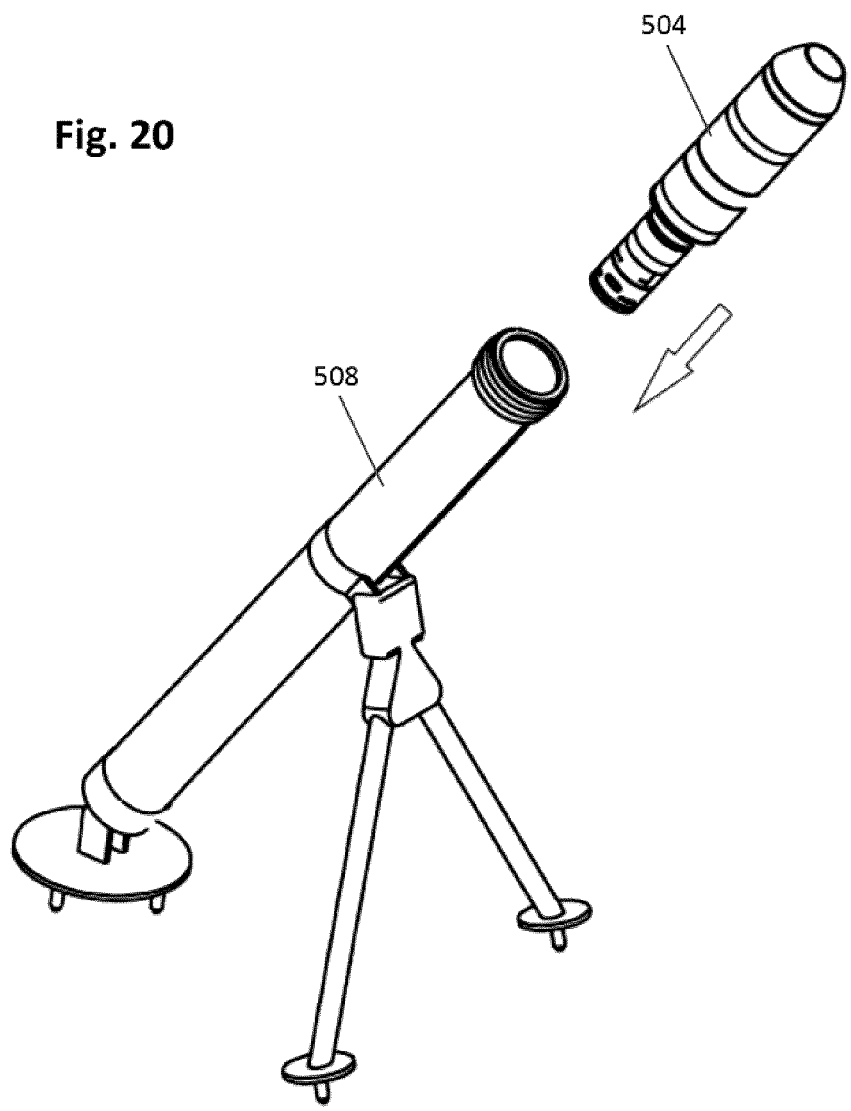
FIG. 20 shows the training mortar round and cartridge of FIG. 19 being used in a mortar canon.

In a further embodiment, the cartridge of the present disclosure can be configured with a mortar round VISMOD attachment for use in a specially constructed mortar firing tube prop. An example of such a mortar round VISMOD 504 is shown in FIG. 19. The training mortar round VISMOD 504 comprises a cartridge 20 that fits into a shell 506. The training mortar round 504 can be use with a mortar tube 508, as shown in FIG. 20. The training mortar round is, in this example, a drop-fired round. In some embodiments the training mortar round 504 can be configured to send a "detonate signal" (wireless signal of some variety) to a field device that receives the "detonate signal" and detonates shortly after the training mortar 504 is launched. This further adds to the training exercise realism.

In another example, the cartridge of the present disclosure can be configured to fit in a rocket propelled grenade VISMOD (not shown).

Figure 21:
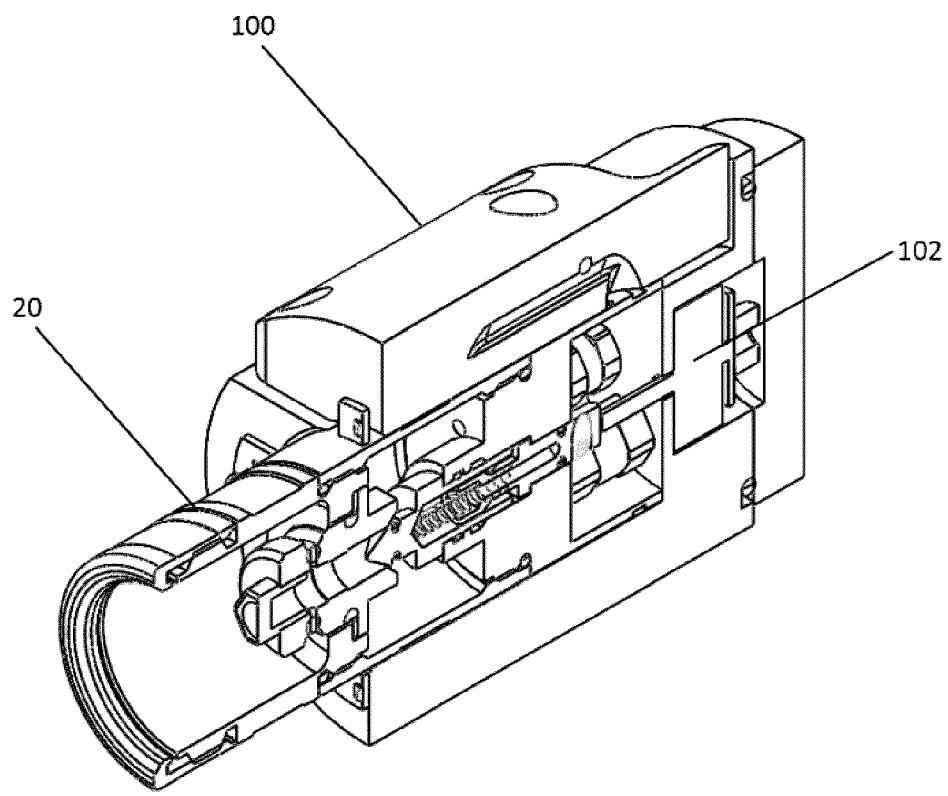
FIG. 21 shows a perspective cut-way view of a cartridge in accordance with the present disclosure installed in an activation mechanism of the present disclosure.

The cartridge of the present disclosure can be activated in any suitable manner. For example, the cartridge 20 in the embodiments shown at FIGS. 3-12 can be activated manually by a user pushing the trigger 36 or through an activation mechanism. In other instances, an activation mechanism can be used such as, the cartridge activation cradle mechanism 100 shown at FIG. 21. FIG. 21. The activation mechanism 100 has a plunger 102 powered by an actuator (not shown). The actuator can be a solenoid-type actuator, a mechanical actuator, a pneumatic actuator, or any other suitable type of actuator.

Figure 22:
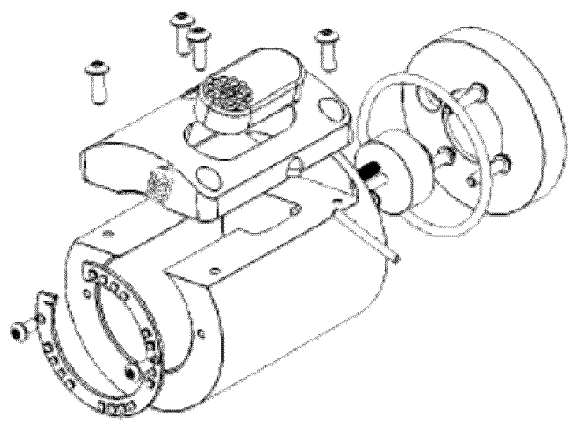
FIG. 22 shows an exploded view of the activation mechanism of FIG. 21.
Figure 23:
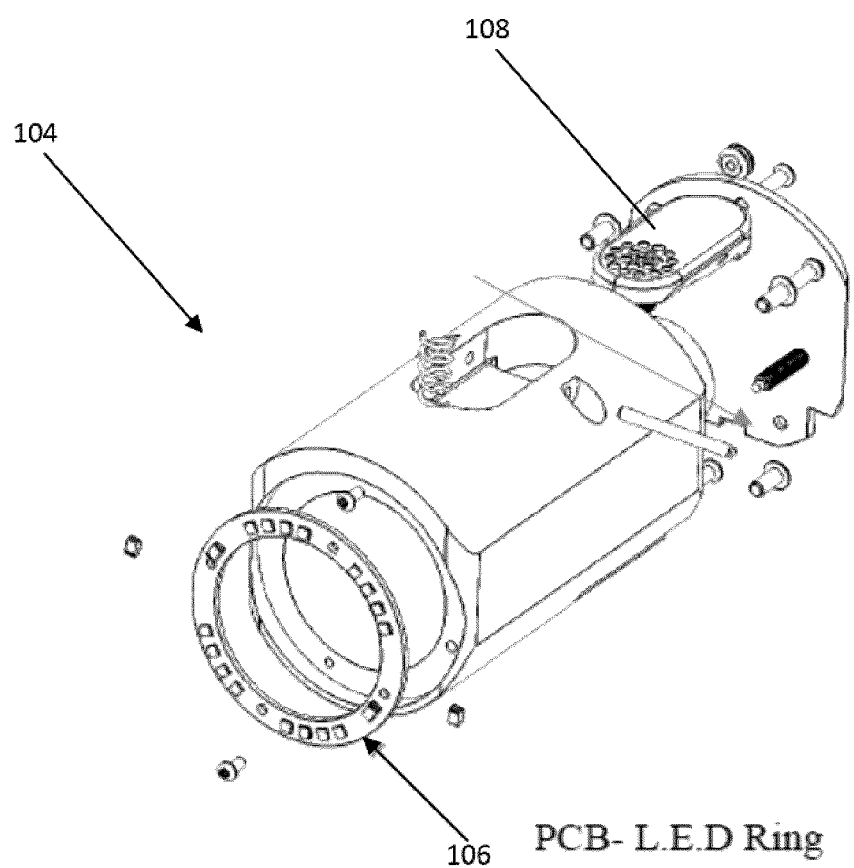
FIG. 23 shows another embodiment of an activation mechanism in accordance with the present disclosure.

FIG. 22 shows an exploded view of the cartridge activation cradle mechanism 100. FIG. 23 shows another example of a cartridge activation cradle mechanism 104, which includes a modular combined light emitting diode (LED) and optical communication assembly ring 106. The combined LED and optical communication assembly ring 106 can be controlled by an embedded microcontroller (not shown) within the cartridge activation cradle mechanism. The combined LED and optical communication assembly ring 106 can be configured to light up and/or initiate message transmission of event data or 'digital effects' in real-time during exercise and in multiple message formats, communication protocols, and/or coding, to other entities in the training environment when the cartridge is set off. The optical communication ring assembly 106 can be configured for control and parallel operation of different optical interfaces simultaneously, intended for transmission of data through multiple laser communication protocols during simulated engagement events. This can provide a more realistic training environment by synchronizing physical and digital effects, which requires maintaining 'real-time' interoperability across multiple platforms with a variety of optical communication interfaces and data transmission protocols, standards and specifications either used by older, legacy devices, or foreign national participants in joint, multinational military training exercises, whereas each nation's military force may employ 'stovepiped' training devices that only transmit or receive data on a single platform, using either national approved or vendor proprietary communication standards, protocols or message sets, instead of multiplatform, multi-code training devices. Further, instead of a combined optical communication assembly and LED ring, the cartridge activation cradle mechanism can be fitted and provide control of other single purpose or dual purpose devices that can be attached, appended or embedded such as a laser device that can transmit and receive data or emit laser light (visible or infrared) using multiple optical interfaces simultaneously with different communication protocols and hardware configuration settings upon the cartridge being set off and/or with a wireless communication assembly (e.g. radio frequency (RF) emitter) that can be configured for control and parallel operation of multiple RF modules, multiple RF communication protocols, and emission of pre-specified RF pattern (e.g., a directional RF pattern, omnidirectional pattern) to transmit device event data in real-time when the cartridge is set off. The laser device can be configured to transmit and receive device event data in real-time (i.e. operational kill codes, admin, position, ownership, identity data), through either one-way or two-way lasers, such that, if detected by a training vest worn by a soldier or receivers mounted to vehicles or buildings, will indicate that the physical entity has changed status and properties (e.g. received injury or damage, has been repaired) during the training exercise. Other single and multi-purpose devices that can be attached, appended or embedded with the activation mechanism 104 include input/output modules for administrative reprogramming and device status change, user control modules with visual display screens and input buttons, and/or control modules for remote access or detonation from exercise control centres. The activation mechanism 104 has a latch mechanism 108 that allows to hold the cartridge 20 and, when spent, remove the cartridge. In other configurations, the combined optical communication assembly and LED ring 106 may lake alternative shapes and forms aside from a ring, such as a square or rectangle, and be mounted in any direction or encased in any suitable location within proximity of the activation mechanism.

Figure 24:
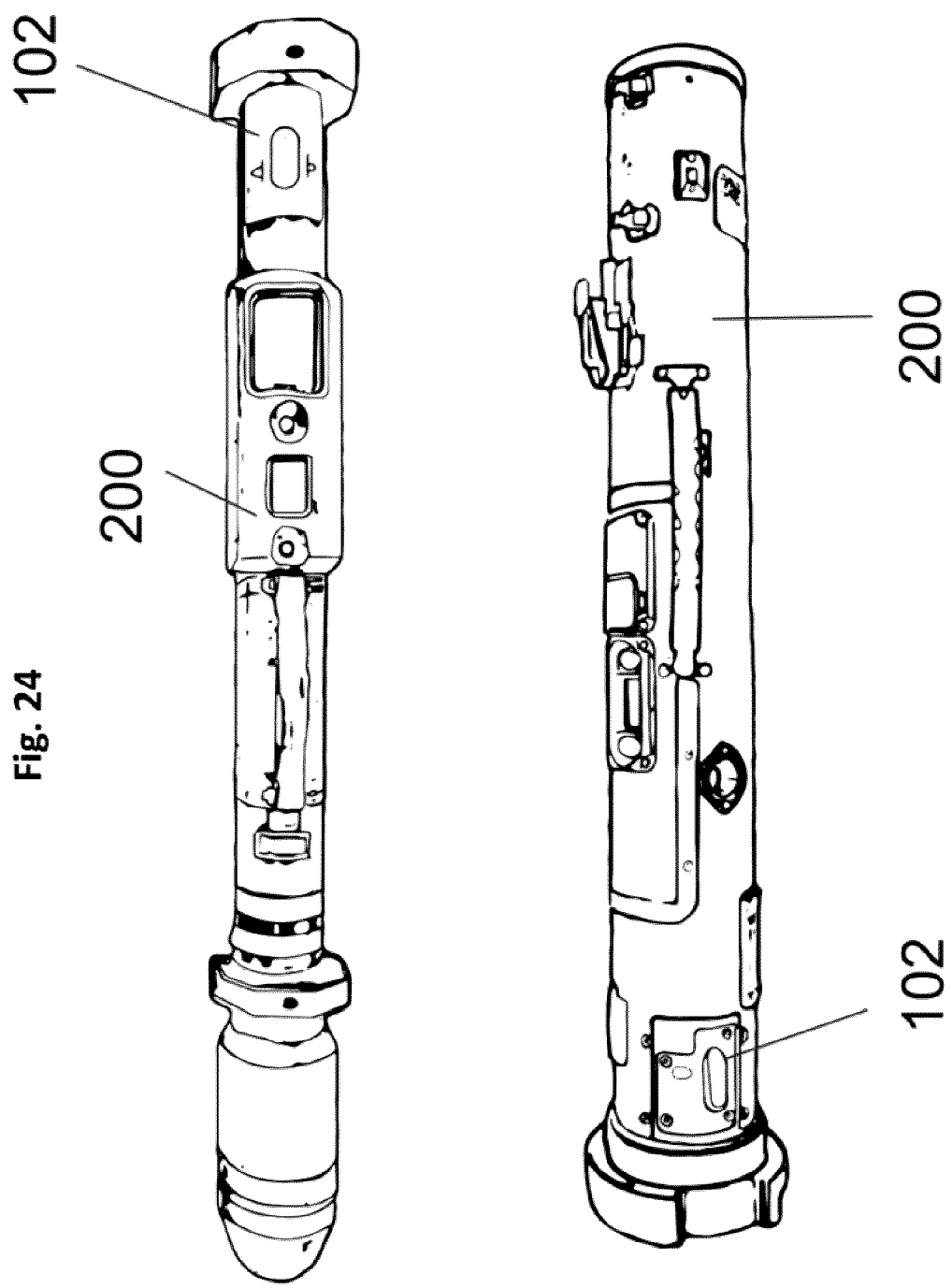
FIG. 24 shows a training anti-tank weapon configured to operate with a cartridge in accordance with the present disclosure.
Figure 27:
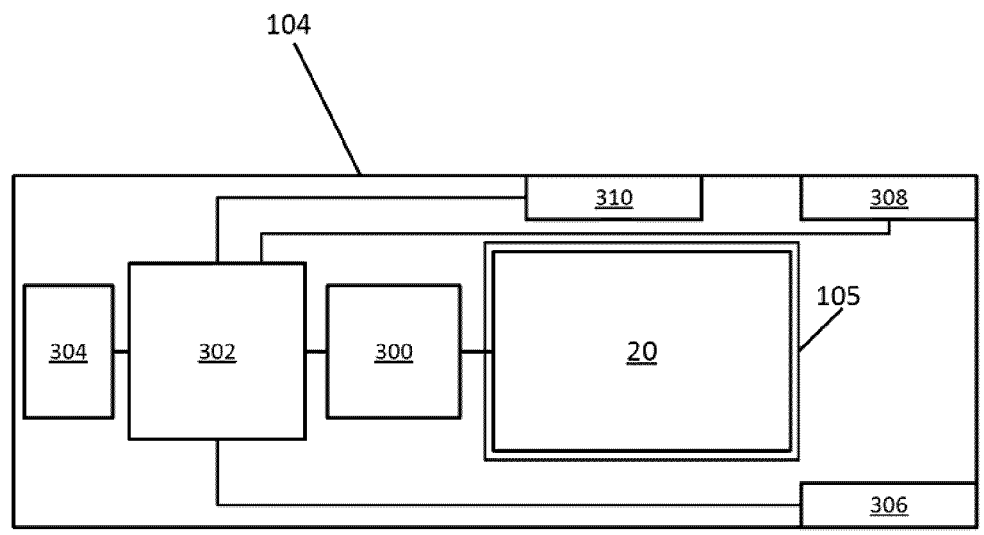
FIG. 27 shows a block diagram of an embodiment of the activation device of the present disclosure.

The activation mechanisms 102 and/or 104 can be made part of any suitable military training device such as, for example, a training anti-tank weapon 200 shown at FIG. 24. The activation mechanism can also be used by itself as shown at FIG. 27 or attached to vehicles, buildings or fitted in a mortar training device shown at FIG. 13. Further, the activation mechanism can also be integrated in rocket propelled grenade training devices (not shown).

Figure 25:
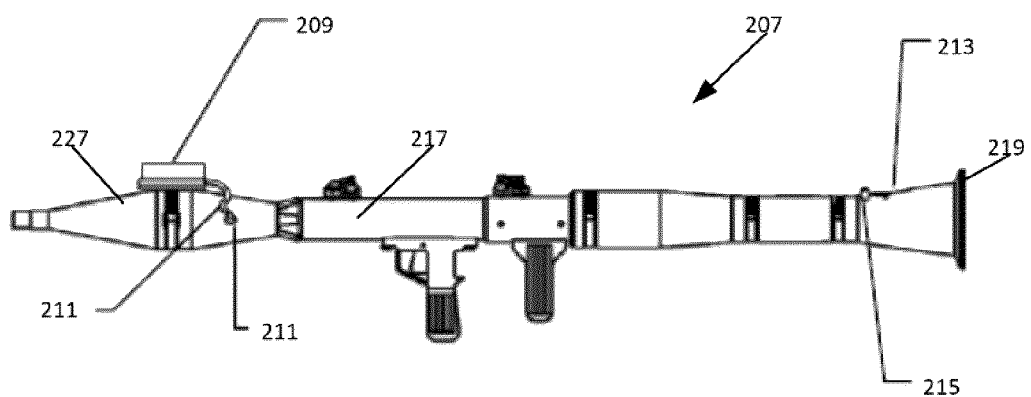
FIG. 25 shows another embodiment of a training anti-tank weapon configured to operate with a cartridge in accordance with the present disclosure.

FIG. 25 shows another training anti-tank weapon 207, fitted with an attachable optical communication assembly 209 (can be referred to as a light source), an input/output (I/O) communication port 211 to connect attachable optical communication assembly 209 to a communication module disposed in another portion of the anti-tank weapon 207. The optical communication assembly 209 can be configured as either a one-way or two way laser, and connects to the I/O communication port 211 with a cable 210. Optional configurations include connection to the I/O communication port and/or communication assembly 209 without the use of cables (e.g. Bluetooth connection). The I/O communication module can be activated by the triggering of the anti-tank weapon 207, which also detonates a cartridge (not shown) held in activation device (cradle) 213, which can be detachable. This results in generation of physical effects and digital effects simultaneously, which increases realism and overall training effectiveness. The training anti-tank weapon 207 also includes a wireless communication module 215, which can comprise an RF source. The launch tube 217 can house an optional power source as well as circuitry required for the activation device 213 to communicate with the optical communication assembly 209 and the wireless communication module 215. Additionally, a modular and replaceable LED/IR ring 219 can be part of the training anti-tank weapon 207 and, the training anti-tank weapon is fitted with a removable rocket head 221, which is connectable to the launch tube 217, by screwing the removable rocket head 227 to the blast chamber 217. Any other suitable attaching means (e.g. snap fit) is also within the scope of the present disclosure.

Figure 26:
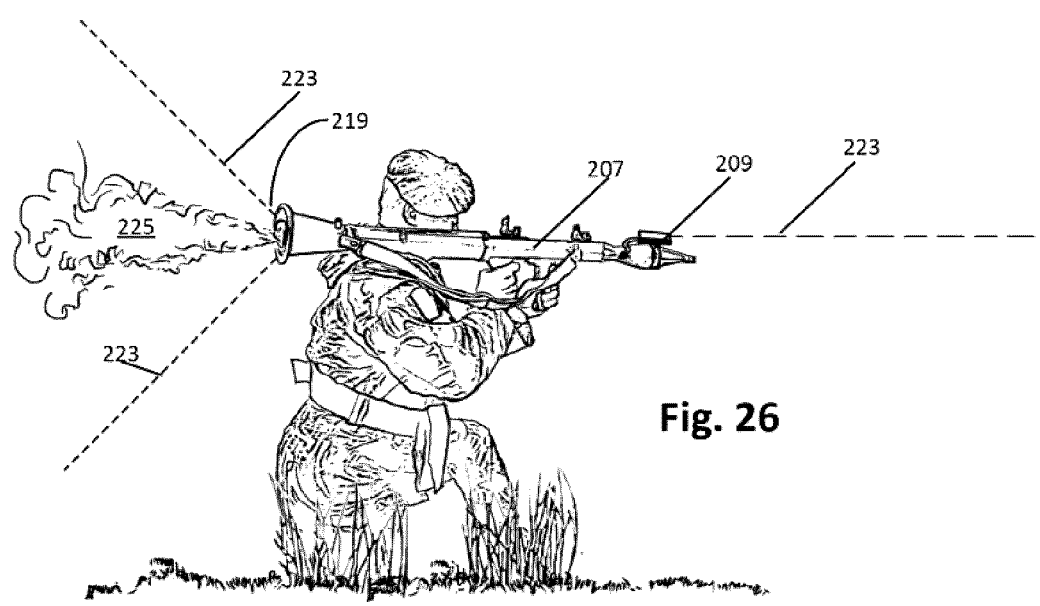
FIG. 26 shows a soldier using the training anti-tank weapon of FIG. 25.

FIG. 26 shows a soldier using the training anti-tank weapon 207, with a cartridge activation mechanism embedded in the rear launch tube and optical communication assembly 209 attached to the rocket head 227. In this Figure, the optical communication assembly 209 is activated to generate transmission and receipt to digital effects through device data (i.e. operational kill codes, admin, position, ownership, identity data) line-of-sight in real-time 223 frontwards toward the target selected by the soldier, and backwards to create digital back blast effects. These digital backblast effects are used in conjunction with physical smoke or concussive effects to simulate weapon signature effects generated out the rear of the weapon upon firing, and can be detected by other entities (e.g. players or objects) equipped with laser detectors. The digital effects are generated through use of multiple optical interfaces simultaneously with different communication protocols and hardware configuration settings, to enable multi-platform transmission for interoperability with legacy devices and other 'stovepiped' training devices and receivers, to include one-way and two-way laser systems. Additional line-of-sight light is generated by the LED/IR ring 219. Smoke effects 225 are also shown.

FIG. 27 shows a block diagram of an embodiment of the activation device (mechanism) 104 in which a cartridge 20 is installed. The activation device 104 can be part of any suitable VISMOD of cartridge of the present disclosure, and it can also be embedded, appended, attached or connected to any existing military training device, simulator, vehicle, weapon system, building or personnel. The activation device 104 has a holder portion 105 that can removably hold the cartridge 20. The holder portion can also contain a sensor or input/output port for data transfer between the trigger module 300 and the installed cartridge 20 to detect presence of installed cartridges and/or control features of installed cartridges. The activation device 104 may be configured to house more than one cartridge 20 of the present disclosure, including alternative non-pyro cartridges of varying forms and sizes with capability to set off multiple cartridges simultaneously, individually or sequentially. The activation device 104 may also be configured for optional activation of, one or more pyrotechnic cartridges and/or alternative types of dummy or training ammunition as it is not is limited to activating only non-pyrotechnic or non-combustible cartridges 20 of the present disclosure. The activation device 104 also has an interface module 304 which can receive any suitable type of input, or use any type of suitable input devices, to set off the cartridge. Additionally, the activation device 104 is not limited to input exclusively from a single interface module 304, as it may be optionally configured to receive input from multiple interface modules concurrently and/or in parallel. Such inputs include, for example, an optical input, an RF input, a digital input, an analog input, etc., as well as other modalities of input such as mechanical motion, audible sound waves, ultrasound and infrasound waves, human input, environmental and atmospheric. The input can include data to control physical effects and user experiences generated by detonating the cartridges, such as specifying timing of cartridge detonation, projection of additional visual, audible, or haptic cues (e.g. lights, speakers) when the cartridge is detonated. The data can also indicate if additional message sets (e.g. position location, player data, status updates, damage or casualty data), are to be generated upon detonation of the cartridge. Types of suitable input devices include, for example, sensors (accelerometer, temperature, infra-red, ultrasonic, touch, proximity, pressure, level, smoke or gas, gyroscopes, magnetic, chemical, acoustic, fluctuation enhanced sensors, etc.), scanners (3-d scanner, laser scanner, image scanner), computers, tablets and cell phones.

The interface module 304 is operationally connected to a controller 302. When the interface module 304 receives the input, which can be referred to as an action signal, from a signal source, the interface module 304 can output a signal to a controller 302. The controller 302 can be part of the interface module 304 or can be distinct from the controller 302. In turn, the controller 302 (interface module 304), upon receiving the action signal, can output a trigger signal to a trigger module 300, which, in turn, set offs (triggers) the cartridge 20. Upon receiving the action signal, the controller 302, may operate the trigger module 300, RF emitter 310, laser transmitter 308 and LED ring 306 simultaneously and/or separately as individual components. The trigger module 300 is thus connected to the holder portion 105 and is configured to trigger the cartridge 20 when the trigger module 300 receives the trigger signal.

The activation device 104 can comprise a light source and, the action signal can include data indicating that the light source is to be energized when the cartridge is triggered. In this case, the interface module sends a light-on signal to the light source to turn on the light source in response to receiving the action signal. The light source can be a light emitting diode (LED ring 306), a laser (laser device 308), or any other suitable light source.

Instead of, or in addition to a light source, the activation device 104 can comprise a radio frequency (RF) assembly and, the action signal can include data indicating that the RF assembly is to be energized and transmit data when the cartridge is triggered. In this case, the interface module sends an RF-on signal to the RF source to turn on the RF source in response to receiving the action signal. The RF source can be any suitable RF source.

In some embodiments, the interface module 304 (controller 302) can be configured to receive a settings signal distinct from the action signal. The settings signal can contain settings data that configure the interface module to send, in accordance with the settings data a light-on signal to the light source when the cartridge is triggered and/or an RF-on signal to the RF source when the cartridge is triggered.

The controller 302 can output light-on signal to the LED ring 306, and/or to a laser device 308. The controller 302 can output an RF-on signal to the RF emitter 310.

The trigger module 304 can, for example, be operationally connected to a trigger mechanism (not shown) when the cartridge 20 is mounted in a training weapon that has a trigger (e.g., training anti-tank rocket launcher) or a switch mechanism (e.g. a pressure switch in a training landmine). In these examples, activating the trigger mechanism or the switch mechanism would provide, e.g., an electrical signal (action signal) to the interface module 304.

Additionally, the activation device 104 can send a signal (RF, optical, etc.) to an optional remote activation device, also equipped with a cartridge of the present disclosure. For example, a training mortar canon can include an activation device (e.g., the activation device 104) that, upon detonating a cartridge, send a signal to another activation device 104 to detonate the cartridge in the other activation device. In such a scenario, the other activation device would have been installed beforehand in an area to be aimed at by the training mortar canon.

In training environments where physical effects are not required or, are not possible to implement, an activation device configured to house electronic cartridge types, dummy cartridges or to not receive and hold any cartridge at all, can be used.

For example, the activation device 104 can be configured to house and control electronic cartridge types, which are single or multipurpose devices similar to the size, shape and form of re-useable non-pyro cartridges 20 within this present disclosure. The activation device 104 is optionally configured to utilize additional sensors and I/O ports in the trigger module 300 and housing 105, whereas the cartridge 20 is configured to utilize alternative power sources instead of gas (e.g. batteries) and other electronically initiated components (e.g. speakers, LCD display screens) to generate physical effects, such as audio or visual cue, or to indicate diagnostic errors. The cartridge 20 contain alterative power sources instead of gas (e.g. batteries) inside the RCGC 24, electronic components (e.g. speakers) within the blast compartment 26 to generate physical effects without the use of a burst disk or compressed gas, and the trigger module 22 is configured with sensors or I/O ports (e.g. metal contact sensors, metal contact chips) to communicate with the activation device 104. Similar in operation to cartridges 20 within this present disclosure, for electronic cartridge types there is a conduit extending from the power source (e.g. battery) to the electronic components (e.g. speaker and microphone) that contains a form of a controllable stopper that can block or be repositioned using a mechanism connected to the trigger module 22. Upon receipt of a signal, the trigger module 22 manipulates the stopper to allow the power source to energize the effect generator embedded in the blast compartment to produce physical effects, such as audio/visual cues, while also allowing data transmission between these components to flow freely. As a result, the activation device 104 can simultaneously perform the functions of triggering cartridge effects (e.g. speaker sounds), controlling effects through data transfer (e.g. data input into speaker within cartridge specifying type of sound effects to be generated or speaker hardware configurations) and receive feedback from cartridge (e.g. microphone sensor reporting reflection of sound waves).

In another example, the activation mechanism 104 can be configured to house dummy cartridges, which limit or eliminate the physical effects produced by the cartridge, yet maintains integrity of training device VISMOD in terms of simulator form. A soldier could require use of a training grenade device with digital effects only, and insert a dummy cartridge into the grenade simulator instead of a non-pyre cartridge 20 of the present disclosure, where the dummy cartridge has same weight, form and fit as the non-pyro cartridge 20 into the activation mechanism 104. Use of a dummy cartridge enables change of training grenade functions (e.g. no physical effect simulation), without impacting or generating negative, unintended changes to the overall training grenade size and weight (which replicates actual weapon system look and feel) which would occur if no cartridge was inserted and instead a large opening remained. The use of a dummy non-pyre enables manufacture and design of a single, multipurpose, modular, configurable training device with multiple modes and functionalities.

As another example, the activation device 104 can be configured to not receive and hold either non-pyro cartridges, electronic cartridges or dummy cartridges. Such an activation device would comprises a light source; and an interface module configured to receive an action signal from a signal source and to send a light-on signal to the light source in response to receiving the action signal. This cartridge-less activation device can be fitted in any suitable VISMOD and operated similarly to the activation device 304 but, with any triggering mechanism to trigger a cartridge. In some embodiments, this activation device can run with an action signal that includes data indicating that the light source is to be energized. Further, the activation device can comprise a radio frequency (RF) source, wherein the action signal includes data indicating that the RF source is to be energized and, the interface module is configured to send an RF-on signal to the RF source in response to receiving the action signal.

Figure 28:
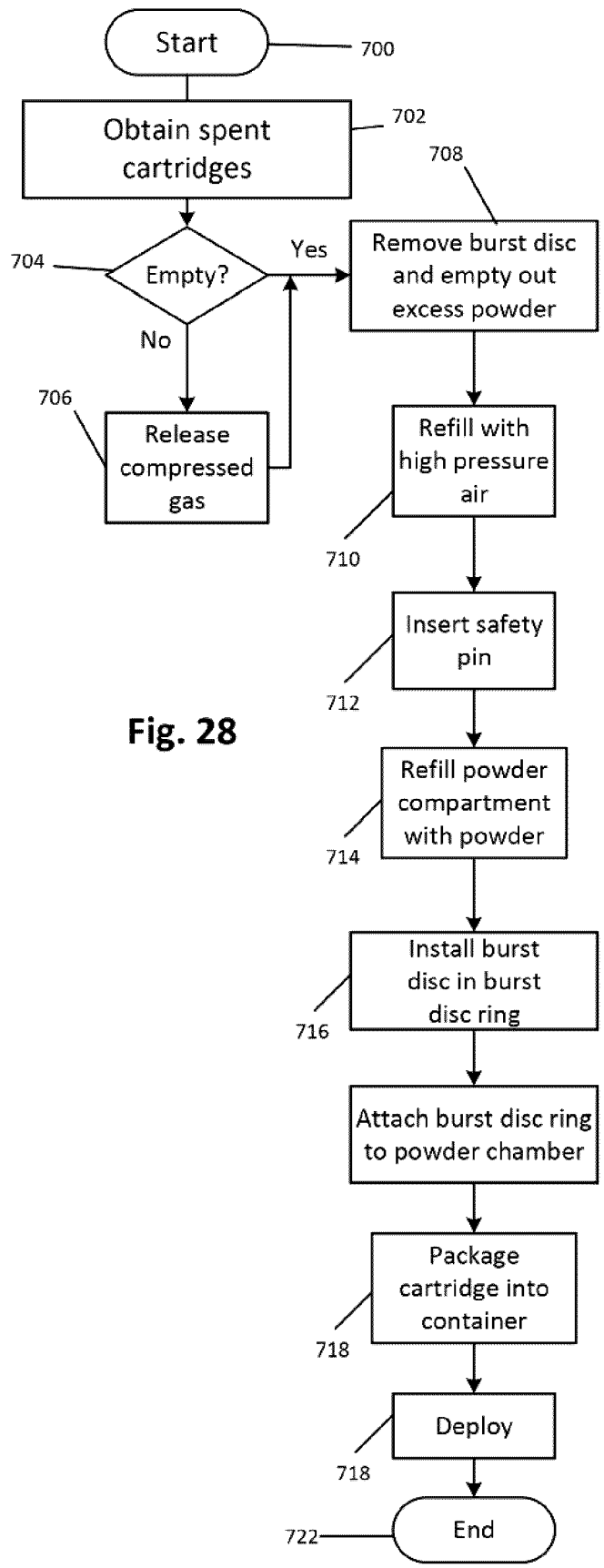
FIG. 28 shows a flowchart of a method in accordance with an embodiment of the present disclosure.

The present disclosure also provides an apparatus and a method for refilling spend cartridges, such as those described in the exemplary embodiments above. The method allows the cartridges to be refilled quickly, at the training site or at any supply chain location. FIG. 28 shows a flowchart of an example of the method.

The method starts at action 700 and, at action 702, spend cartridges are obtained. Subsequently, at action 704, it is determined if the cartridge is empty of compressed gas. If it is not, any compressed gas present in the cartridge can be removed, at action 706, by using custom hand tools to manually drain/empty the compartments. Then, the method proceeds to action 708 where, if required, the damaged burst disc and the remaining powder (or other content types leftover in the blast chamber) are removed from the blast compartment. If it is determined, at action 704, that there is no compressed gas in the cartridge, the method proceeds directly from action 704 to action 708.

After action 710, the cartridge is refilled with compressed gas up to the desired pressure. This action can be carried out quickly by an operator using a compressed gas cylinder that has quick fill trigger mechanism that can couple to the refile valve of the cartridge. At action 712, a lock pin is removably installed in the cartridge in order to keep the stopper of the cartridge in the sealed configuration.

At action 714, the blast compartment of cartridge is refilled with powder (or other suitable content type) and a new burst disc in installed at an aperture of the blast compartment. The installation of the burst disc can include installing the burst disc in a ring (action 716) and then installing burst disc/ring assembly on the blast chamber.

Following the refill of the cartridge, the cartridge can be stored in a container (action 720) and subsequently deployed at the training area. The method ends at 722.

As will be understood by the skilled worker, the present disclosure also relates to the cartridge of the present disclosure in combination with any suitable type of refill equipment.

FIG. 29 shows cartridges of the present disclosure in both small and large formats. As will be understood by the skilled worker, any suitable materials can be used in manufacturing the cartridge, VISMODs, and activation device of the present disclosure. Such materials include polymers, resins, metals, carbon fiber, etc.

The present disclosure relates to a military training cartridge, activation mechanism and refill, delivery and lifecycle management equipment that improves on previous non-pyro device paradigm (simulator, explosion simulator, IED simulator or non-pyro explosive device sim, or mine simulator, or effects simulator).

The cartridge and activation mechanism of the present disclosure replaces existing pyrotechnic training cartridges and pyrotechnic initiation assemblies (ATWESS, MGSS, and DIFCUE) in military training devices, overcoming technical challenges of safety, reducing damage to environment and equipment, eliminating operational constraints of special transport and disposal requirements, and enabling improvements to military training effectiveness through synchronization of physical and digital effects. The cartridge and activation mechanism also provides a means to reduce invasive technicians required for emplacement, operation and resupply of pyrotechnic-based battlefield effects equipment and weapon signature simulators.

The cartridge and activation mechanism of the present disclosure has increased functionality compared to legacy ATWESS, MGSS, and DIFCUE pyrotechnic initiation assemblies. The activation mechanism of the present disclosure overcomes technical limitations of pyro launchers by allowing ancillary FX modules (speaker, lights, laser, infrared), as well as communication assembly modules capable of transmitting event data to be embedded in, appended to, or located within close proximity of pyrotechnic launcher assemblies.

The cartridge, activation mechanisms and refill, delivery and lifecycle management equipment of the present disclosure overcomes technical challenges of employing legacy non-pyro devices in the field (quick refill, improved efficiency, improved reliability, reduced logistical footprint including tools, personnel and vehicles required to transport large devices), while also overcoming logistical, transportation and regulatory constraints for large scale military training exercises requiring high volumes of physical and digital effects, specifically, high volume processing and supply of cartridges, training devices, and modular communication assemblies The cartridge of the present invention can be used in a workflow process and distribution center model for high-volume cartridge refill (including tools), this did not exist before as other non-pyro devices operated with low-volume refill.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The cartridge and activation mechanisms equipment of the present disclosure has increased functionality for synchronizing digital and physical effects in real-time during military training exercises, across multiple, disparate, single communications platforms of legacy devices and vendor systems, through use of multiple interface modules in parallel operation for transmission of device event data (e.g. operational, admin, position, ownership, identity).

The cartridge and activation mechanisms equipment of the present disclosure has increased functionality for syncing digital and physical effects using VISMODs for high-fidelity realistic simulation and physical replication of military weapons platforms, whereas previous pyrotechnic and non-pyrotechnic devices effect generation devices and methods enabled low-fidelity replication of form, fit and function for operational realism, real-time, during exercises.

The invention claimed is:

1. An activation device for a military training cartridge, the activation device comprising:
   a controller configured to receive an input signal;
   a holder to removably hold the military training cartridge, the military training cartridge being distinct from the activation device;
   a trigger module connected to the controller and to the holder, the controller configured to output a trigger signal in accordance with the input signal, the trigger module configured to trigger the military training cartridge in accordance with the trigger signal;
   at least one of: (i) a light source connected to the controller and (ii) a radio frequency (RF) emitter connected to the controller, the controller configured to:
      when the activation device comprises the light source, output a light-on signal and the light source configured to emit light in accordance with the light-on signal, and
      when the activation device comprises the RF emitter, output an RF-on signal, the RF emitter configured to emit an RF signal in accordance with the RF-on signal.

2. The activation device of claim 1, wherein the activation device comprises the light source and the light source includes at least one of a light emitting diode (LED) and a laser.

3. The activation device of claim 2, wherein the LED, the laser, or both are disposed to surround the cartridge when the cartridge is held in the holder.

4. The activation device of claim 1, wherein the activation device comprises the light source and the light-on signal is to signal to the light source to transmit, when the cartridge is triggered, device event data in real-time.

5. The activation device of claim 4, wherein the event data includes at least one of: kill code data, position data, identification data and ownership data.

6. The activation device of claim 1, wherein the activation device comprises the RF emitter, the RF-on signal is to signal to the RF emitter to transmit, when the cartridge is triggered, RF device event data in real-time.

7. The activation device of claim 6, wherein the event data includes at least one of: kill code data, position data, identification data and ownership data.

8. The activation device of claim 1, wherein the activation device comprises the light source and the light-on signal is configured cause the light source to send a remote trigger signal to a remote activation device to trigger a remote cartridge held by the remote activation device.

9. The activation device of claim 1, wherein the activation device comprises the RF emitter and the RF-on signal is configured cause the RF emitter to emit a remote trigger signal to a remote activation device to trigger a remote cartridge held by the remote activation device.

10. The activation device of claim 1, wherein the activation device is configured to be coupled to a weapon, the light source to simulate a visual signature of the weapon.

11. The activation device of claim 10, wherein:
the weapon has a trigger mechanism configured to generate the input signal upon triggering of the trigger mechanism, the input signal being an electrical signal, and
the trigger module is configured to couple to the trigger mechanism.

12. The activation of claim 1, wherein the holder is configured to hold a non-pyro military training cartridge, the cartridge having a blast compartment, the cartridge configured to produce a blast and a smoke powder effect, when the cartridge is held in by holder and is triggered.

13. The activation device of claim 1, wherein the input signal is an electrical signal.

14. An activation device for a military training cartridge, the activation device comprising:
a holder to removably hold the military training cartridge, the military training cartridge being distinct from the activation device;
a trigger module coupled to the holder and configured to trigger the military training cartridge; and
at least one of:
(i) an optical communication assembly coupled to the trigger module and configured to do at least one of:
receive an optical signal, and
when the military cartridge is triggered, emit an optical signal,
and
(ii) a wireless communication assembly coupled to the trigger module and configured to,
when the military training cartridge is triggered, emit a wireless signal.

15. The activation device of claim 14, wherein the activation device comprises the optical communication assembly and the optical communication assembly comprises at least one of a laser and a light emitting diode.

16. The activation device of claim 14, wherein the activation device comprises the wireless communication assembly and the wireless communication assembly comprises at least one of a radio frequency (RF) communication assembly and a personal area network communication assembly.

17. The activation device of claim 14, wherein the activation device comprises the optical communication assembly and the optical communication assembly is configured to transmit device event data in real-time, the device event data comprising at least one of kill code data, position data, identification data and ownership data.

18. The activation device of claim 14, wherein the activation device comprises the wireless communication assembly and the wireless communication assembly is configured to transmit device event data in real-time, the device event data comprising at least one of kill code data, position data, identification data and ownership data.

19. The activation device of claim 14, wherein the wireless communication assembly is also configured to receive a wireless signal.

* * * * *